US012245283B2

(12) United States Patent
Taherzadeh Boroujeni et al.

(10) Patent No.: US 12,245,283 B2
(45) Date of Patent: Mar. 4, 2025

(54) MESSAGE 2 INDICATION OF MESSAGE 3 REPETITION AND FREQUENCY HOPPING FOR MESSAGE 3 REPETITION

(71) Applicant: QUALCOMM Incorporated, San Diego, CA (US)

(72) Inventors: Mahmoud Taherzadeh Boroujeni, San Diego, CA (US); Tao Luo, San Diego, CA (US); Xiaoxia Zhang, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 697 days.

(21) Appl. No.: 17/499,372

(22) Filed: Oct. 12, 2021

(65) Prior Publication Data

US 2022/0124822 A1 Apr. 21, 2022

Related U.S. Application Data

(60) Provisional application No. 63/137,653, filed on Jan. 14, 2021, provisional application No. 63/093,005, filed on Oct. 16, 2020.

(51) Int. Cl.
*H04W 74/0833* (2024.01)
*H04W 72/23* (2023.01)

(52) U.S. Cl.
CPC ....... *H04W 74/0833* (2013.01); *H04W 72/23* (2023.01)

(58) Field of Classification Search
CPC .......................... H04W 74/0833; H04W 72/23
See application file for complete search history.

(56) References Cited

U.S. PATENT DOCUMENTS 10,091,816 B2 * 10/2018 Zhao ..................... H04W 74/08
2017/0273056 A1 * 9/2017 Papasakellariou .. H04W 52/143
(Continued)

FOREIGN PATENT DOCUMENTS

WO 2017052445 A1 3/2017

OTHER PUBLICATIONS

Huawei, et al., "Discussion on the Potential Coverage Enhancement Solutions for Other Channels", 3GPP Draft, 3GPP TSG RAN WG1 Meeting #102-e, R1-2005274, 3rd Generation Partnership Project (3GPP), Mobile Competence Centre, 650, Route Des Lucioles, F-06921 Sophia-Antipolis Cedex, France, vol. RAN WG1, No. E-meeting, Aug. 17, 2020-Aug. 28, 2020, (Aug. 8, 2020), XP051917322, 2 Pages, Retrieved from the Internet: URL: https://ftp.3gpp.org/tsg_ran/WG1_RL1/TSGR1_102-e/Docs/R1-2005274.zip R1-2005274. docx [Retrieved on Aug. 8, 2020], The Whole Document.

(Continued)

*Primary Examiner* — Jael M Ulysse
(74) *Attorney, Agent, or Firm* — Arent Fox LLP

(57) ABSTRACT

A random access procedure between a user equipment (UE) and a base station may include repetition of a random access message 3 based on an indication provided by a random access response (RAR) message including a physical downlink control channel (PDCCH) portion and a physical downlink shared channel (PDSCH) portion. The base station may transmit the RAR message to indicate at least one random access message 3 repetition parameter. The UE may determine at least one random access message 3 repetition parameter based on the RAR message. The UE may transmit the random access message 3 with repetition based on the message 3 repetition parameter, and the base station may receive the random access message 3 based on the repetition parameter, thereby improving coverage of the random access message 3.

28 Claims, 20 Drawing Sheets

(56) References Cited

U.S. PATENT DOCUMENTS

| | | | |
|---|---|---|---|
| 2019/0261407 A1 | 8/2019 | Irukulapati et al. | |
| 2020/0120709 A1* | 4/2020 | Bergquist | H04W 72/23 |
| 2021/0058947 A1* | 2/2021 | Lin | H04W 74/002 |
| 2021/0076384 A1* | 3/2021 | MolavianJazi | H04L 5/0094 |
| 2022/0015150 A1* | 1/2022 | Ye | H04W 72/542 |
| 2023/0188261 A1* | 6/2023 | Awadin | H04L 1/1864 |
| | | | 370/329 |
| 2023/0199862 A1* | 6/2023 | Li | H04W 52/325 |
| | | | 370/329 |
| 2023/0262753 A1* | 8/2023 | Axnäs et al. | H04W 74/006 |
| | | | 370/329 |

OTHER PUBLICATIONS

International Search Report and Written Opinion—PCT/US2021/054813—ISA/EPO—Feb. 10, 2022.

* cited by examiner

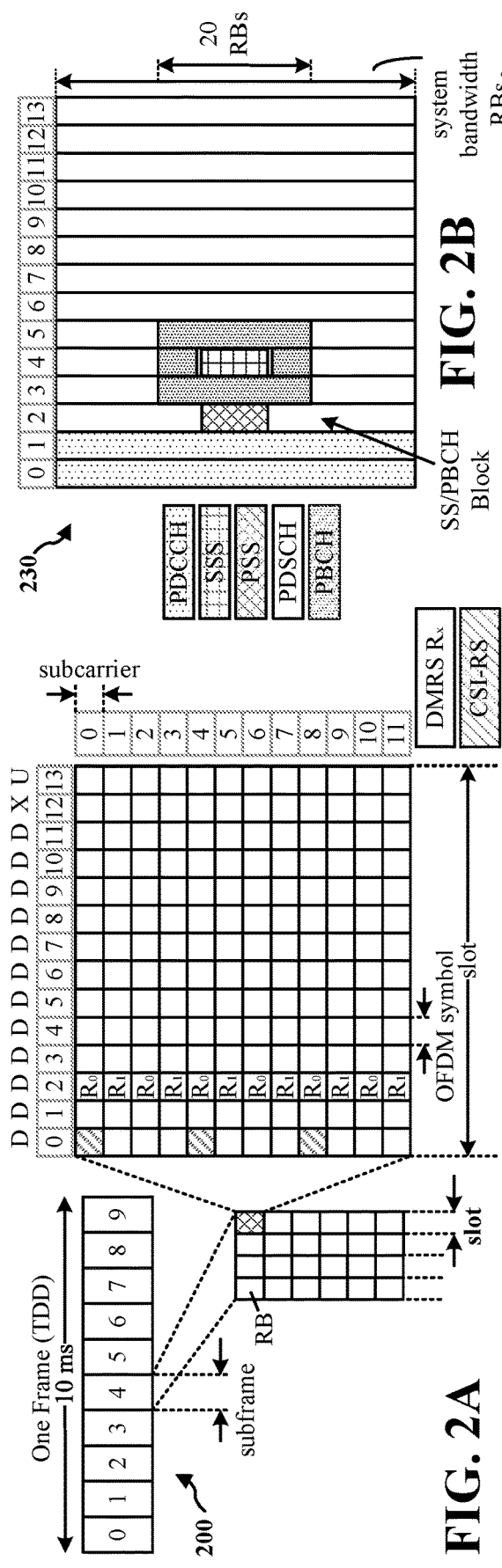
FIG. 2A
FIG. 2B
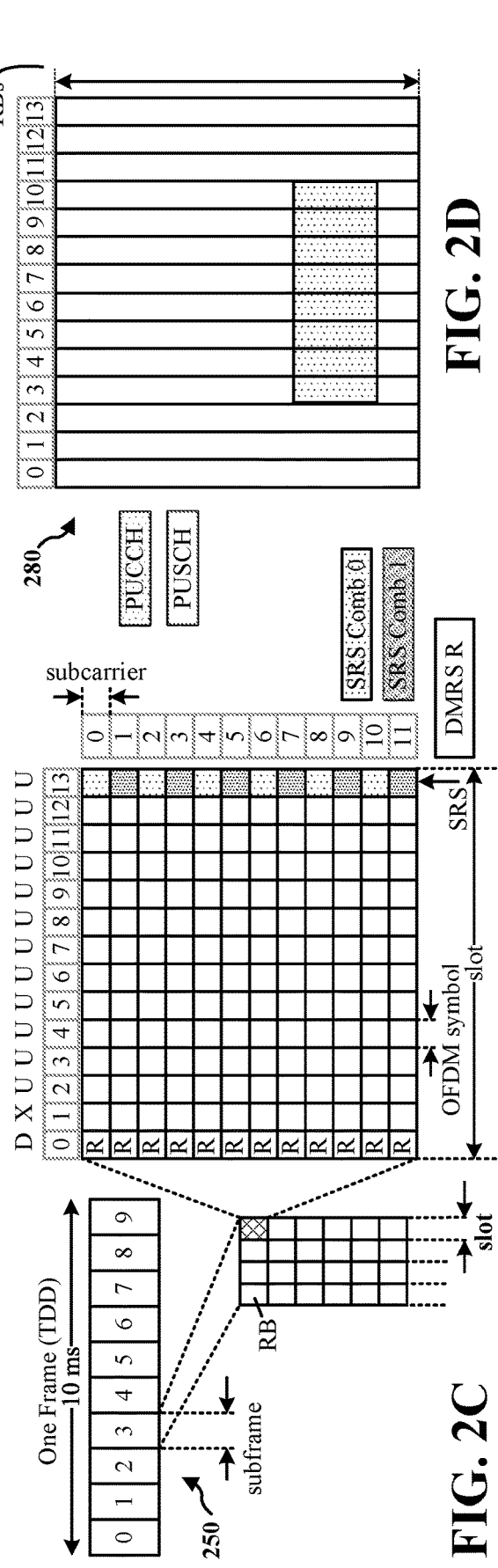
FIG. 2C
FIG. 2D

MESSAGE 2 INDICATION OF MESSAGE 3 REPETITION AND FREQUENCY HOPPING FOR MESSAGE 3 REPETITION

CROSS REFERENCE TO RELATED APPLICATIONS

The present application claims priority to U.S. Provisional Application No. 63/093,005 filed on Oct. 16, 2020 and entitled "MESSAGE 2 INDICATION OF MESSAGE 3 REPETITION," and U.S. Provisional Application No. 63/137,653 filed on Jan. 14, 2021 and entitled "FREQUENCY HOPPING FOR MESSAGE 3 PUSCH REPETITION," the contents of which are hereby incorporated by reference in their entireties.

BACKGROUND

Technical Field

The present disclosure relates generally to wireless communication systems, and more particularly, to a random access procedure using a random access message 2 indication of message 3 repetition.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (such as with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology.

In particular, wireless communication may include a random access procedure that allows a user equipment (UE) to initiate or resume communications with a base station. Under certain channel conditions, various messages of the random access procedure may not be received correctly, which may delay or prevent the UE from connecting to the base station. Improvements are presented herein. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus for wireless communications of a user equipment (UE) are provided. The method may include receiving a random access response (RAR) message that includes a physical downlink control channel (PDCCH) portion and a physical downlink shared channel (PDSCH) portion. The method may include determining at least one random access message 3 repetition parameter based on the RAR message. The method may include transmitting a random access message 3 with repetition according to the at least one random access message 3 repetition parameter.

In some implementations, the at least one random access message 3 repetition parameter includes at least one of: presence of repetition, type of repetition, number of repetitions, frequency offset for frequency hopping, beam index, or TCI state.

In some implementations, the PDCCH portion includes a bit field that indicates the at least one random access message 3 repetition parameter. The bit field may be a single bit that indicates repetition of the random access message 3.

In some implementations, receiving system information that indicates an additional random access message 3 repetition parameter.

In some implementations, determining the at least one random access message 3 repetition parameter based on the RAR message includes selecting a set of preconfigured parameters based on the RAR message.

In some implementations, the PDSCH portion includes the at least one random access message 3 repetition parameter.

In some implementations, transmitting the random access message 3 with repetition includes selecting a repetition type and determining time and frequency domain resources for a number of repetitions of the random access message 3 based on the at least one random access message 3 parameter and the repetition type. Selecting the repetition type may be based on at least one of frequency range, subcarrier spacing, or payload size of the random access message 3. In some implementations, selecting the repetition type is based on system information. In some implementations, selecting the repetition type is based on the RAR message.

In some implementations, transmitting the random access message 3 with repetition includes using a different power level for different repetitions.

In some implementations, the at least one random access message 3 repetition parameter indicates a change in the power level between repetitions.

In an aspect of the disclosure, a method, a computer-readable medium, and an apparatus for wireless communications of a base station are provided. The method may include transmitting a RAR message including a PDCCH portion and a PDSCH portion. The method may include determining at least one random access message 3 repetition parameter based on the RAR message. The method may include receiving a random access message 3 with repetition according to the at least one random access message 3 repetition parameter.

In an aspect of the disclosure, a method, a computer-readable medium, and an apparatus are provided for wireless communication at a user equipment (UE). The apparatus receives, from a base station, an indication to apply frequency hopping for message 3 (Msg3) physical uplink shared channel (PUSCH) retransmissions. The apparatus determines a frequency hopping pattern for the frequency hopping for Msg3 PUSCH retransmissions. The apparatus transmits, to the base station, one or more Msg3 PUSCH retransmissions with frequency hopping and based on the frequency hopping pattern.

In an aspect of the disclosure, a method, a computer-readable medium, and an apparatus are provided for wireless communication at a base station. The apparatus transmits, to a UE, an indication to apply frequency hopping for Msg3 PUSCH retransmissions. The apparatus receives, from the UE, one or more Msg3 PUSCH retransmissions with frequency hopping, the one or more Msg3 PUSCH retransmissions being based on a frequency hopping pattern.

To the accomplishment of the foregoing and related ends, the one or more aspects comprise the features hereinafter fully described and particularly pointed out in the claims. The following description and the annexed drawings set forth in detail some illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame according to aspects of the present disclosure.

FIG. 2B is a diagram illustrating an example of DL channels within a subframe according to aspects of the present disclosure.

FIG. 2C is a diagram illustrating an example of a second frame according to aspects of the present disclosure.

FIG. 2D is a diagram illustrating an example of a subframe according to aspects of the present disclosure.

DETAILED DESCRIPTION

Figure 1:
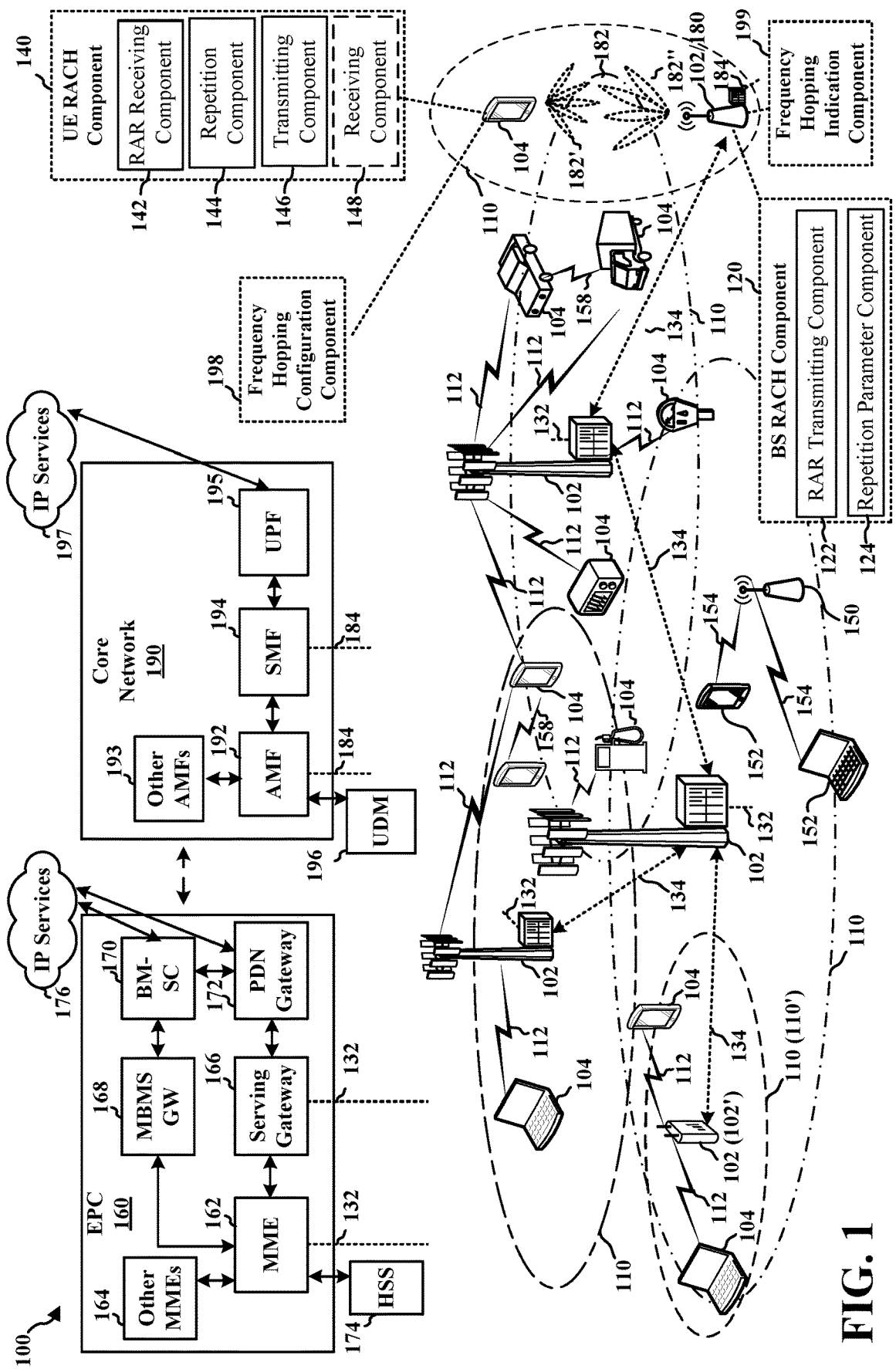
FIG. 1 is a diagram illustrating an example of a wireless communications system and an access network according to aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those of ordinary skill in the art that these concepts may be practiced without these specific details. In some instances, structures and components are shown in block diagram form in order to avoid obscuring such concepts.

In a random access channel (RACH) procedure, under some channel conditions, transmitted messages may not be received correctly. In particular, when high carrier frequencies are utilized, transmissions may be subject to high path loss. Beamforming between a user equipment (UE) and a base station may overcome the path loss experienced at high carrier frequencies. During a RACH procedure, however, beamforming between the UE and the base station may not be established, for example, because the UE has been inactive prior to the RACH procedure.

The present disclosure addresses at least this problem with RACH procedures by utilizing repetition of a RACH message 3, which increases the likelihood that one or more repetitions of the message 3 will be received correctly. Although 3GPP Release 15 and 16 provide for repetition of a physical uplink shared channel (PUSCH), such repetition is based on UE-specific configuration and an uplink grant for the UE. In a RACH scenario, the UE-specific configuration may not be established and a grant procedure is different. The present disclosure provides RACH message 3 repetition parameters based on a random access response (RAR) message. For example, the RACH message 3 repetition parameters may include: presence of repetition, type of repetition, number of repetitions, frequency offset for frequency hopping, beam index, or TCI state. The RACH message 3 repetition parameters may also include parameters for PUSCH repetition.

Particular implementations of the subject matter described in this disclosure can be implemented to realize one or more of the following potential advantages. In some implementations, the described techniques can be used to improve reliability of the RACH procedure, and thus, facilitate access to a wireless network and establish a communication connection between a UE and a base station.

Several aspects of telecommunication systems will now be presented with reference to various apparatus and methods. These apparatus and methods will be described in the following detailed description and illustrated in the accompanying drawings by various blocks, components, circuits, processes, algorithms, among other examples (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, among other examples, whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (for example, a 5G Core (5GC)). The base stations 102 may include macrocells (high power cellular base station) or small cells (low power cellular base station). The macrocells include base stations. The small cells include femtocells, picocells, and microcells.

In an aspect, one or more of the UEs 104 may include a UE RACH component 140 configured to perform a RACH procedure including transmitting a random access message 3. The UE RACH component 140 may include a RAR receiving component 142 configured to receive a RAR message that includes a PDCCH portion and a PDSCH portion. The UE RACH component 140 may include a repetition component 144 configured to determine at least one random access message 3 repetition parameter based on the RAR message. The UE RACH component 140 may include a transmitting component 146 configured to transmit a random access message 3 with repetition according to the at least one random access message 3 repetition parameter. The UE RACH component 140 may include a receiving component 148 configured to receive a random access message 4.

Figure 10:
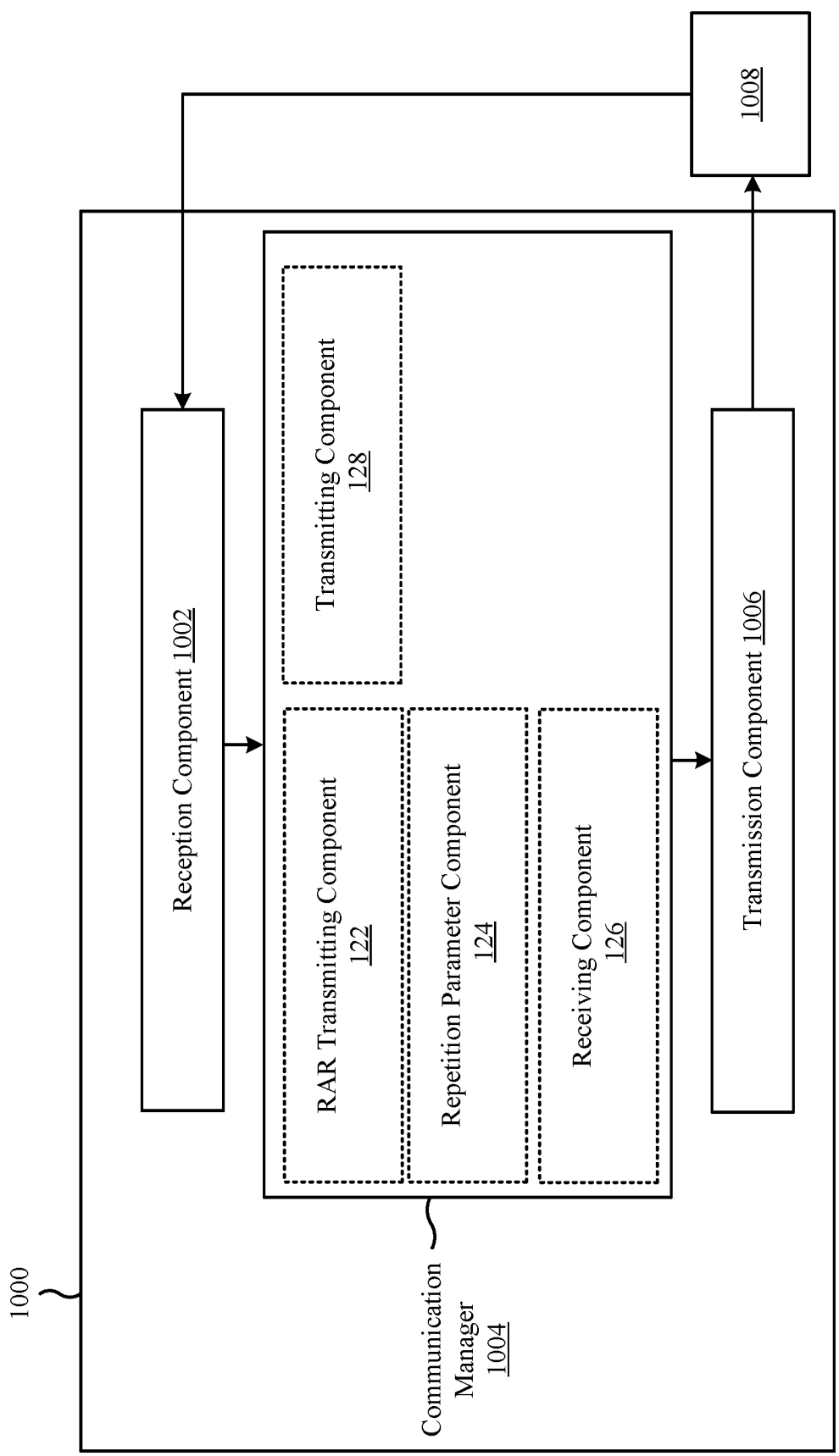
FIG. 10 is a block diagram of an example apparatus, such as a base station, for wireless communication according to aspects of the present disclosure.

In an aspect, one or more of the base stations 102 may include a base station (BS) RACH component 120 configured to receive one or more repetitions of the random access message 3. The BS RACH component 120 may include a RAR transmitting component 122 configured to transmit a RAR message including a PDCCH portion and a PDSCH portion. The BS RACH component 120 may include a repetition parameter component 124 configured to determine at least one random access message 3 repetition based on the RAR message. As illustrated in FIG. 10, the BS RACH component 120 may include a receiving component 126 configured to receive a random access message 3 with repetition according to the at least one random access message 3 repetition parameter. As illustrated in FIG. 10, the BS RACH component 120 may include a transmitting component 128 configured to transmit a random access message 4.

In certain aspects, the UE 104 may include a frequency hopping configuration component 198 configured to apply frequency hopping for Msg3 PUSCH retransmissions of a RACH procedure. In one configuration, the frequency hopping configuration component 198 may be configured to receive, from a base station, an indication to apply frequency hopping for Msg3 PUSCH retransmissions. In such a configuration, the frequency hopping configuration component 198 may select a frequency hopping pattern for the frequency hopping for Msg3 PUSCH retransmissions. In such configuration, the frequency hopping configuration component 198 may transmit, to the base station, one or more Msg3 PUSCH retransmissions with frequency hopping and based on the frequency hopping pattern.

In certain aspects, the base station 102/180 may include a frequency hopping indication component 199 configured to indicate to a UE (e.g., the UE 104) to apply frequency hopping for Msg3 PUSCH retransmissions of a RACH procedure. In one configuration, the frequency hopping indication component 199 may be configured to transmit, to a UE, an indication to apply frequency hopping for Msg3 PUSCH retransmissions. In such configuration, the frequency hopping indication component 199 may receive, from the UE, one or more Msg3 PUSCH retransmissions with frequency hopping, the one or more Msg3 PUSCH retransmissions being based on a frequency hopping pattern.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (for example, an S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (for example, handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (for example, through the EPC 160 or core network 190) with each other over third backhaul links 134 (for example, X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 112 between the base stations 102 and the UEs 104 may include uplink (UL) (also referred to as reverse link) transmissions from a UE 104 to a base station 102 or downlink (DL) (also referred to as forward link) transmissions from a base station 102 to a UE 104. The communication links 112 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (for example, 5, 10, 15, 20, 100, 400 MHz, among other examples) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (for example, more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to or increase capacity of the access network.

A base station 102, whether a small cell 102' or a large cell (such as macro base station), may include an eNB, gNodeB (gNB), or other type of base station. Some base stations, such as gNB 180 may operate in one or more frequency bands within the electromagnetic spectrum.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, or other IP services.

The base station may include or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (for example, MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (for example, parking meter, gas pump, toaster, vehicles, heart monitor, among other examples). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description presented herein applies also to a 5G/NR frame structure that is TDD.

Other wireless communication technologies may have a different frame structure or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu0$ to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), or UCI.

Figure 3:
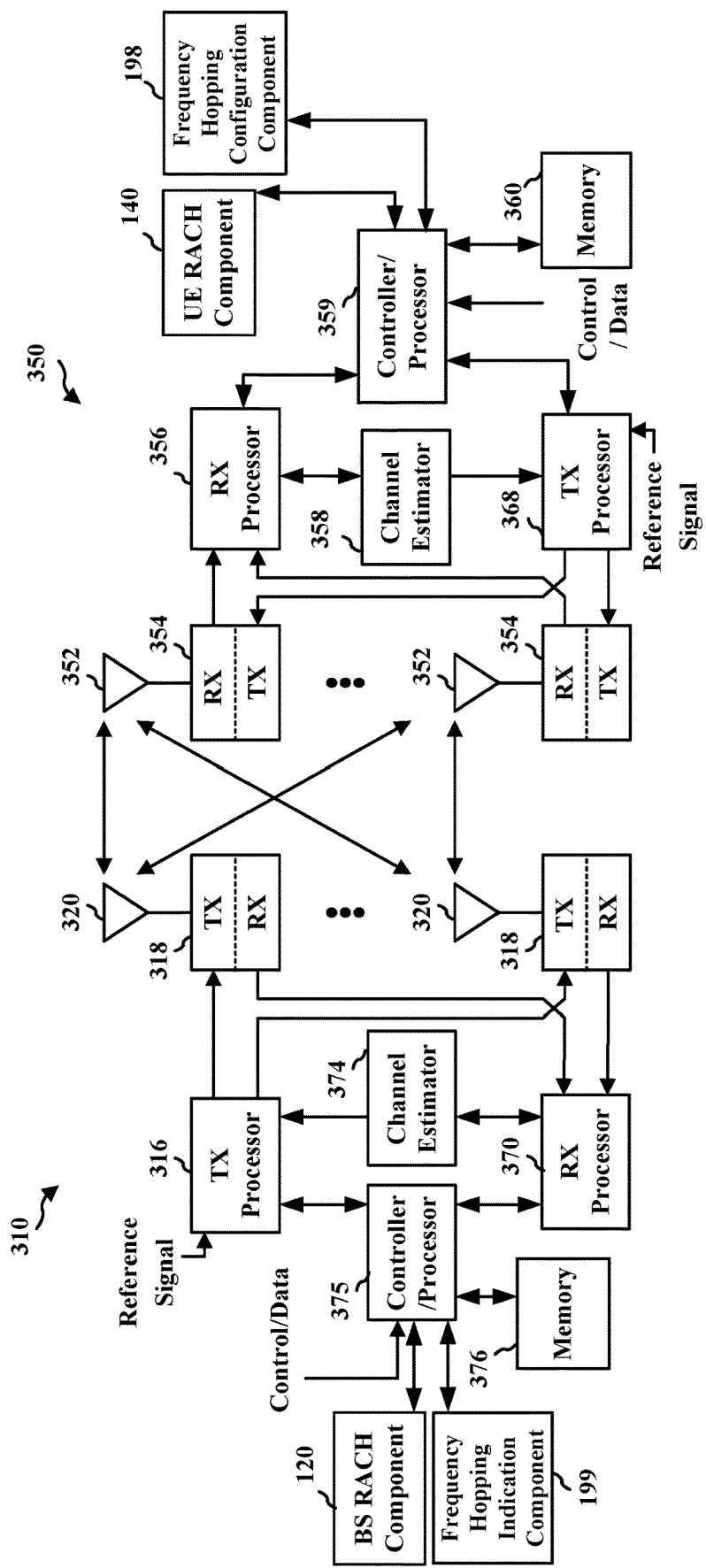
FIG. 3 is a diagram illustrating an example of a base station and user equipment (UE) in an access network according to aspects of the present disclosure.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (such as MIB, SIBs), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (such as a pilot) in the time or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK or NACK protocol to support HARQ operations.

Similar to the functionality described in connection with the DL transmission by the base station 310, the controller/processor 359 provides RRC layer functionality associated with system information (for example, MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK or NACK protocol to support HARQ operations.

At least one of the TX processor 368, the RX processor 356, and the controller/processor 359 may be configured to perform aspects in connection with the UE RACH component 140 and/or the frequency hopping configuration component 198 of FIG. 1.

At least one of the TX processor 316, the RX processor 370, and the controller/processor 375 may be configured to perform aspects in connection with the BS RACH component 120 and/or the frequency hopping indication component 199 of FIG. 1.

Figure 4:
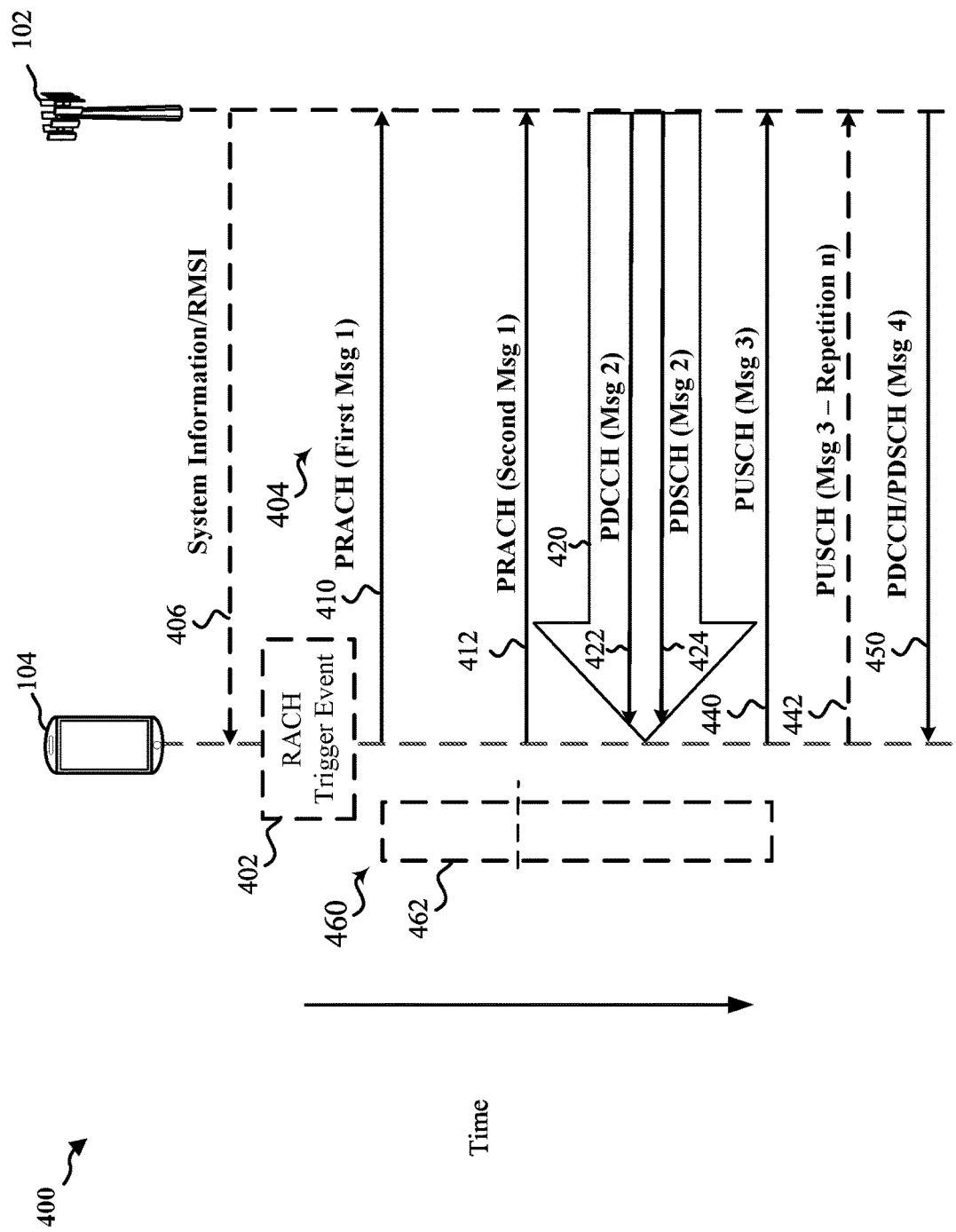
FIG. 4 is a diagram illustrating an example message exchange for a random access channel (RACH) procedure between a base station and a UE in an access network according to aspects of the present disclosure.

FIG. 4 is a diagram 400 illustrating an example message exchange for a RACH procedure 404 between a base station 102 and a UE 104 in an access network. The UE 104 may include a UE RACH component 140. In some implementations, the UE 104 may be an NR-Light UE having lower capabilities or coverage than other UEs. The base station 102 may include a BS RACH component 120. Prior to the RACH procedure 404, the base station 102 may transmit system information 406 such as remaining minimum system information (RMSI) and the UE 104 may receive the system information 406. The UE 104, however, may not have established a radio resource control (RRC) connection and may not be configured with UE specific parameters.

Referring additionally to Table 1 (below), during operation, the UE 104 may execute an implementation of an NR RACH procedure 410, according to a 4-step NR RACH message flow, due to the occurrence of one or more RACH trigger events 402. Suitable examples of RACH trigger events 402 may include, but are not limited to: (i) the UE 104 performing an initial access to transition from an RRC_IDLE state to RRC_CONNECTED ACTIVE state; (ii) the UE 104 detecting downlink (DL) data arrival while in an RRC_IDLE state or RRC_CONNECTED INACTIVE state; (iii) the UE 104 determining UL data arrival from higher layers during RRC_IDLE state or RRC_CONNECTED INACTIVE state; (iv) the UE 104 performing a handover from another station to the base station 102 during the connected mode of operation; and (v) the UE performing a connection re-establishment procedure such as a beam failure recovery procedure.

The NR RACH procedure 404 may be associated with a contention-based random access procedure, or with a contention-free random access procedure. In an implementation, a contention-based NR RACH procedure corresponds to the following RACH trigger events 402: an initial access from RRC_IDLE to RRC_CONNECTED ACTIVE; UL data arrival during RRC_IDLE or RRC_CONNECTED INACTIVE; and a connection re-establishment. In an implementation, a contention-free NR RACH procedure corresponds to the following RACH trigger events 402: downlink (DL) data arrival during RRC_IDLE or RRC_CONNECTED INACTIVE; and, a handover during the connected mode of operation.

On the occurrence of any of the above RACH trigger events 402, the execution of the NR RACH procedure 404 may include the 4-step NR RACH message flow (see FIG. 4 and Table 1), where UE 104 exchanges messages with one or more base stations 102 to gain access to a wireless network and establish a communication connection. The messages may be referred to as random access messages 1 to 4, RACH messages 1 to 4, or may alternatively be referred to by the PHY channel carrying the message, for example, message 3 PUSCH.

TABLE 1

NR RACH procedure, including Messages and Message Content transmitted over corresponding Physical (PHY) channel(s).

| PHY Channel | Message | Message content |
| --- | --- | --- |
| PRACH | Msg 1 | RACH Preamble |
| PDCCH/PDSCH | Msg 2 | Detected RACH preamble ID, TA, TC-RNTI, backoff indicator, UL/DL grants |
| PUSCH | Msg 3 | RRC Connection request (or scheduling request and tracking area update) |
| PDCCH/PDSCH | Msg 4 | Contention resolution message |

In a first step of a first RACH procedure, for example, UE 104 may transmit a message (Msg 1) 410, which may be referred to as a random access request message, to one or more base stations 102 via a physical channel, such as a physical random access channel (PRACH). For example, Msg 1 410 may include one or more of a RACH preamble and a resource requirement. The UE 104 may transmit the Msg 1 410 on a random access opportunity (RO). In an aspect, the RACH preamble may be a relatively long preamble sequence, which may be easier for the base station 102 to receive than an OFDM symbol. In an aspect, the UE random access component 140 may select a beam for transmission of the Msg 1 410 based on received synchronization signal blocks (SSBs) transmitted by the base station 102.

In an aspect, to improve coverage of the random access preamble and/or Msg 3, an enhanced coverage RACH procedure may be used. For example, the UE 104 may transmit a second Msg 1 412 on the PRACH. For instance, the UE 104 may transmit the second Msg 1 412 in response to determining that the PDCCH portion 422 of the RAR message 420 is not received during a first portion 462 of the RAR window 460. That is, the UE 104 may be configured to start a second, concurrent, enhanced coverage RACH procedure when such a procedure may be helpful improve reception of RACH messages. In some implementations, the UE 104 may transmit the second Msg 1 412 in response to a measurement by the UE 104 (e.g., if SSB-based RSRP is less than a certain threshold). The UE 104 may use a coverage-enhanced transmission method for the second Msg 1 412. For instance, the UE 104 may repeat transmission of the second Msg 1 412 on different ROs. As another example, the second Msg 1 412 may follow a pattern to request coverage enhancement. For example, the UE 104 may indicate a request for coverage enhancement based on one or a combination of: time resources of the Msg 1, format of the Msg 1, or a sequence of the Msg 1. For example, a subset of the available PRACH sequences may be associated with coverage enhancement.

In a second step, the base station 102 may respond to receiving Msg 1 410 by transmitting a second message (Msg 2), which may be referred to as a random access response (RAR) message 420. The RAR message 420 may include a physical downlink control channel (PDCCH) portion 422 and a physical downlink shared channel (PDSCH) portion 424. In an aspect, the UE random access component 140 may monitor the PDCCH during a RAR window 460 based on the Msg 1 410 to detect a PDCCH portion 422 of the RAR message 420 as a DCI format 1_0 with a cyclic redundancy check (CRC) scrambled by a RA-RNTI corresponding to the Msg 1 410 and receive the PDSCH portion 424 of the RAR message 420 as a transport block in a corresponding PDSCH within the RAR window 460. The RAR receiving component 142 may pass the transport block to higher layers, which may parse the transport block for a random access preamble identity (RAPID) associated with the Msg 1 410. If the higher layers identify the RAPID in the transport block, the higher layers indicate an uplink grant to the RAR receiving component 142 at the physical layer. This is referred to as RAR UL grant in the physical layer. For example, Msg 2 may include one or more of a detected preamble identifier (ID), a timing advance (TA) value, a temporary cell radio network temporary identifier (TC-RNTI), a backoff indicator, or an UL grant.

In response to receiving Msg 2 PDSCH portion 424, the UE 104 transmits to the base station 102 a third message (Msg 3) 440, which may be an RRC connection request or a scheduling request, via a physical uplink channel such as PUSCH based on the RAR UL grant provided in Msg 2 of the base station 102. In an aspect, a UE that is experiencing conditions that may result in poor reception of the Msg 3 by a base station 102 may use repetitions to enhance reception of the Msg 3 and further RACH messages by the base station 102. For example, if the UE is an NR-Light UE that has relatively low transmission power, repetition of the Msg 3 may improve reception of the Msg 3 at the base station 102. Other conditions that may result in poor reception of the Msg 3 may include the use of high frequencies (such as carriers in the mmWave band), an obstructed line of sight, or interference.

In an aspect, to improve coverage of the Msg 3, the base station 102 may indicate repetition of Msg 3 in the RAR message 420. The RAR message 420 may indicate at least one random access message 3 repetition parameter. The message 3 repetition parameter may include at least one of: presence of repetition, type of repetition, number of repetitions, frequency offset for frequency hopping, beam index, or TCI state. In an implementation, for example, the PDCCH portion 422 of the RAR message 420 may include a bit field that indicates the at least one random access message 3 repetition parameter. As noted above, the PDCCH portion 422 generally uses a DCI format 1_0, which is a downlink grant format. Accordingly, the bit field of the PDCCH portion 422 may have a different interpretation when used for a RAR message 420. For example, the bit field may be a single bit that indicates repetition of the random access message 3. The bit field may be a configurable bit of the DCI format 1_0, or may be another field that has a different interpretation for the RAR message 420. Additional random access message 3 parameters may be either signaled via system information or standardized. For example, the RMSI of the system information 406 may include a field that indicates one or more additional message 3 repetition parameters to use when the PDCCH portion 422 indicates message 3 repetition. As another example, a standards document or regulation may specify one or more additional message 3 repetition parameters to use when the PDCCH portion 422 indicates message 3 repetition. In some implementations, the additional random access message 3 repetition parameters may be grouped into sets of preconfigured parameters. The UE 104 may select a set of preconfigured parameters based on the RAR message 420 (e.g., a bit field that indicates an index of the set of preconfigured parameters).

In another implementation, the PDSCH portion 424 may explicitly indicate one or more random access message 3 repetition parameters. Because the PDSCH portion 424 includes a transport block, the size of the RAR UL grant may be expanded to include random access message 3 repetition parameters. For example, the PDSCH portion 424 may indicate presence of random access message 3 repetition, type of repetition, number of repetitions, and/or additional random access message 3 repetition parameters. For instance, the additional random access message 3 repetition parameters may include frequency offsets for frequency hopping of the message 3 PUSCH repetitions. As another example, the additional random access message 3 repetition parameters may include beam indices and/or TCI states for transmission of different message 3 PUSCH repetitions.

The UE 104 may transmit up to n repetitions 442 of Msg 3 440 based on the Msg 3 repetition parameters. In an aspect, each repetition 442 may utilize a different beam. The beams may be sub-beams of a previously determined beam (e.g., based on SSBs). Accordingly, the beams may refine the previously determined beam and one or more of the beams may be received with greater power or quality. In an aspect, each repetition 442 may utilize a different power level. The at least one random access message 3 repetition parameter may include a change in the power level between repetitions. For example, the UE 104 may add or subtract the change in the power level for each of the n repetitions 442 of Msg 3 440 to ramp up or ramp down the lower level.

In response to receiving Msg 3 440 and/or one of the Msg 3 repetitions 442, the base station 102 may transmit a fourth message (Msg 4) 450, which may be referred to as a contention resolution message, to UE 104 via a PDCCH and a PDSCH. For example, Msg 4 may include a cell radio network temporary identifier (C-RNTI) for UE 104 to use in subsequent communications. In an aspect, the base station 102 may select a beam for transmission of the Msg 4 based on which repetition 442 of the Msg 3 is the strongest.

In some example scenarios, a collision between two or more UEs 104 requesting access in a RO can occur. For instance, two or more UEs 104 may send Msg 1 having a same RACH preamble because the number of RACH preambles may be limited and may be randomly selected by each UE 104 in a contention-based NR RACH procedure. Such UEs selecting the same RACH preamble for the same RO may be referred to as colliding UEs. As such, each colliding UE 104 that selects the same RACH preamble will receive the same temporary C-RNTI and the same UL grant, and thus each UE 104 may send a similar Msg 3. In this case, the base station 102 may resolve the collision in one or more ways. In a first scenario, a respective Msg 3 from each colliding UE 104 may interfere with the other Msg 3, so the base station 102 may not send Msg 4. Then each UE 104 will retransmit Msg 1 with a different RACH preamble. In a second scenario, the base station 102 may successfully decode only one Msg 3 and send an ACK message to the UE 104 corresponding to the successfully decoded Msg 3. In a third scenario, the base station 102 may successfully decode the Msg 3 from each colliding UE 104, and then send a Msg 4 having a contention resolution identifier (such as an identifier tied to one of the UEs) to each of the colliding UEs. Each colliding UE 104 receives the Msg 4, decodes the Msg 4, and determines if the UE 104 is the correct UE by successfully matching or identifying the contention resolution identifier. Such a problem may not occur in a contention-free NR RACH procedure, as in that case, base station 102 may inform UE 104 of which RACH preamble to use.

Figure 5:
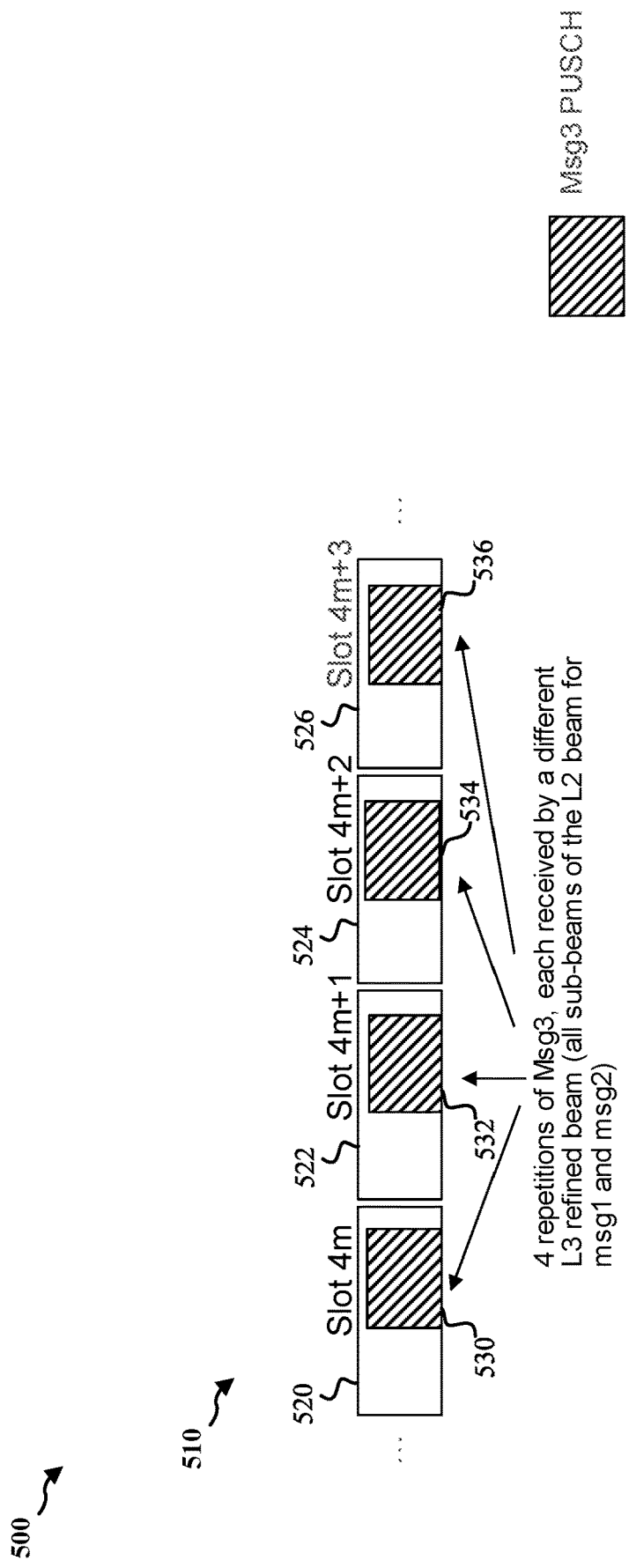
FIG. 5 is a diagram illustrating example resources for repetition of a random access message 3 according to aspects of the present disclosure.

FIG. 5 is a diagram 500 illustrating example resources for repetition of a random access message 3. The resources 510 may be located within consecutive slots 520, 522, 524, and 526. The UE 104 may transmit a repetition 530, 532, 534, 536 of the Msg 3 in each slot 520, 522, 524, and 526. That is, each repetition 530, 532, 534, and 536 may include the same data. The base station 102 may utilize different refined sub-beams to receive each repetition 530, 532, 534, and 536 in the respective slot 520, 522, 524, and 526. A refined sub-beam may refer to a lower level beam in a hierarchical set of beams. For example, a layer 1 (L1) beam may cover multiple L2 beams, which may each cover multiple L3 beams. In an implementation, the beams corresponding to Msg 1 and Msg 2 are L2 beams and each of the different refined sub-beams beams is an L3 beam. The L3 refined beams may be based on an L2 beam used for the Msg 1 and the Msg 2. That is, the base station 102 may generate different sub-beams of the L2 beam to attempt to improve reception of the Msg 3.

In an aspect, the base station 102 may select one of the received repetitions 530, 532, 534, and 536 based on one or more criteria. For example, the base station 102 may determine which one of the received repetitions 530, 532, 534, and 536 is the strongest and select that repetition. In a first implementation, the base station 102 may detect each repetition of the Msg 3 separately using a corresponding refined beam for each repetition. That is, the base station 102 may receive a signal for each repetition 530, 532, 534, and 536 using a respective refined beam and attempt to decode the Msg 3 based on only the signal received with the respective refined beam. The base station 102 may determine a signal power such as a received signal strength indicator (RSSI) for each repetition 530, 532, 534, and 536. The base station 102 may determine a strongest RSSI and corresponding beam for decoding.

In a second implementation, the base station 102 may improve the likelihood of detection by soft combining the signals received via each of the different refined beams. That is, the base station 102 may soft combine the received signals for the repetitions 530, 532, 534, and 536 to determine the Msg 3. The base station 102 may then determine a reference signal received power (RSRP) for each repetition 530, 532, 534, and 536 based on the Msg 3. For example, the base station 102 may use the decoded Msg 3 as a reference signal and compare each repetition 530, 532, 534, and 536 to the reference signal. Accordingly, the RSRP may indicate a quality of each reference signal. In either the first implementation or the second implementation, the base station 102 may select a beam corresponding to one of the repetitions 530, 532, 534, and 536 (for example, the repetition having the strongest RSSI or RSRP) to use for the Msg 4.

Figure 6:
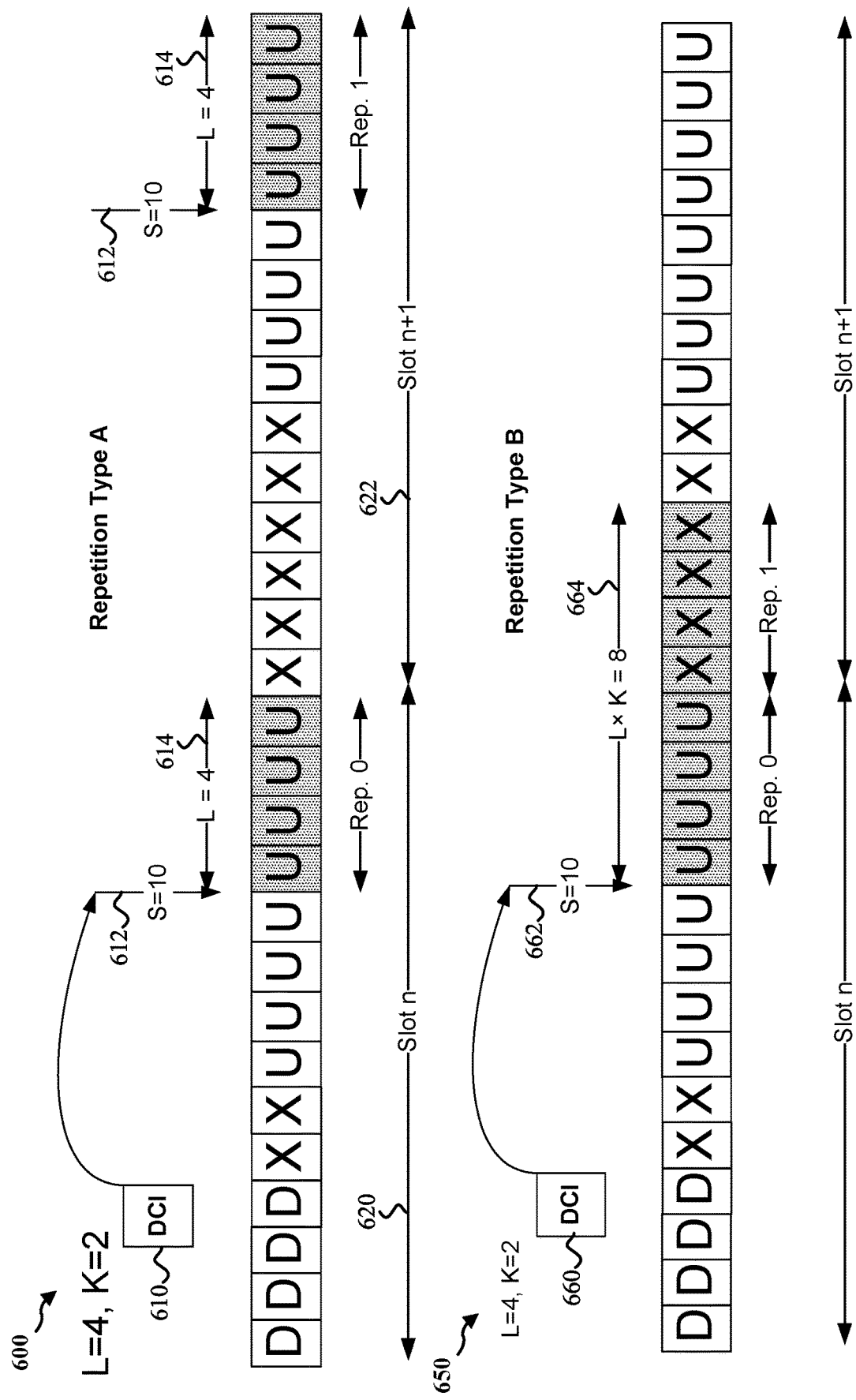
FIG. 6 is a diagram illustrating examples of a first repetition type and a second repetition type according to aspects of the present disclosure.

FIG. 6 is a diagram illustrating a first repetition type 600 and a second repetition type 650. The UE 104 may repeat transmission of the Msg 3 using either of the first repetition type 600 or the second repetition type 650.

The first repetition type 600 may be referred to as repetition type A. In repetition type A, a number of repetitions (K) may be applied across K consecutive slots. A DCI 610 may include a start and length indicator (SLIV) that indicates a start symbol (S) 612 and a length (L) 614 of a first transmission in a first slot 622. The DCI 610 may also specify frequency domain resources. A PUSCH transmission may utilize the frequency domain resources in the symbols of the first slot 620 defined by the SLIV. A PUSCH repetition may utilize the same frequency domain resources in the same symbols of the consecutive slot 622.

The second repetition type 650 may be referred to as repetition type B. In repetition type B, repetitions may occur within or across slots. In general, for repetition type B, a number (K) of nominal repetitions, each with nominal length (L) are sent back-to-back starting from symbol S 662 for a number of symbols L×K 664. S and L are determined based on the SLIV. A repetition may cross a slot boundary. Additionally, the number of repetitions may be dynamically indicated by the DCI 660. The repetitions may hop across frequencies. A repetition may be indicated to use a symbol designated for downlink. Such symbols may be considered invalid for PUSCH. For PUSCH repetition type B, after determining the invalid symbol(s), the remaining symbols may be considered as potentially valid symbols for PUSCH repetition type B transmission. If the number of potentially valid symbols for PUSCH repetition type B transmission is greater than zero for a nominal repetition, the nominal repetition consists of one or more actual repetitions, where each actual repetition consists of a consecutive set of all potentially valid symbols that can be used for PUSCH repetition type B transmission within a slot. An actual repetition with a single symbol is omitted except for the case of L=1. The SLIV format for repetition type B may be different than for repetition type A.

Repetition of a random access message 3 may follow PUSCH repetition type A, PUSCH repetition type B, or another repetition pattern. For example, a repetition pattern for random access message 3 (e.g., a Repetition Type C) may be defined with respect to RACH parameters such as an RO or RAR window 460. In some implementations, the UE 104 and/or the base station 102 may select a repetition type based on the RAR message 420. The UE 104 may determine one or more Msg 3 repetition parameters based on the repetition type. For example, the UE 104 may interpret a field of the RAR message 420 and/or system information 406 based on the selected repetition type. For example, the field may indicate the value of K. The UE 104 may further determine time and frequency domain resources for a number of repetitions of the random access message 3 based on the at least one random access message 3 parameter and the repetition type. For example, the UE 104 may apply parameters such as L, K, and S to a frame structure to determine which symbols to use for the repetitions. Similarly, the UE 104 may apply a frequency hopping pattern to determine the frequency domain resources to use for the repetitions.

Figure 7:
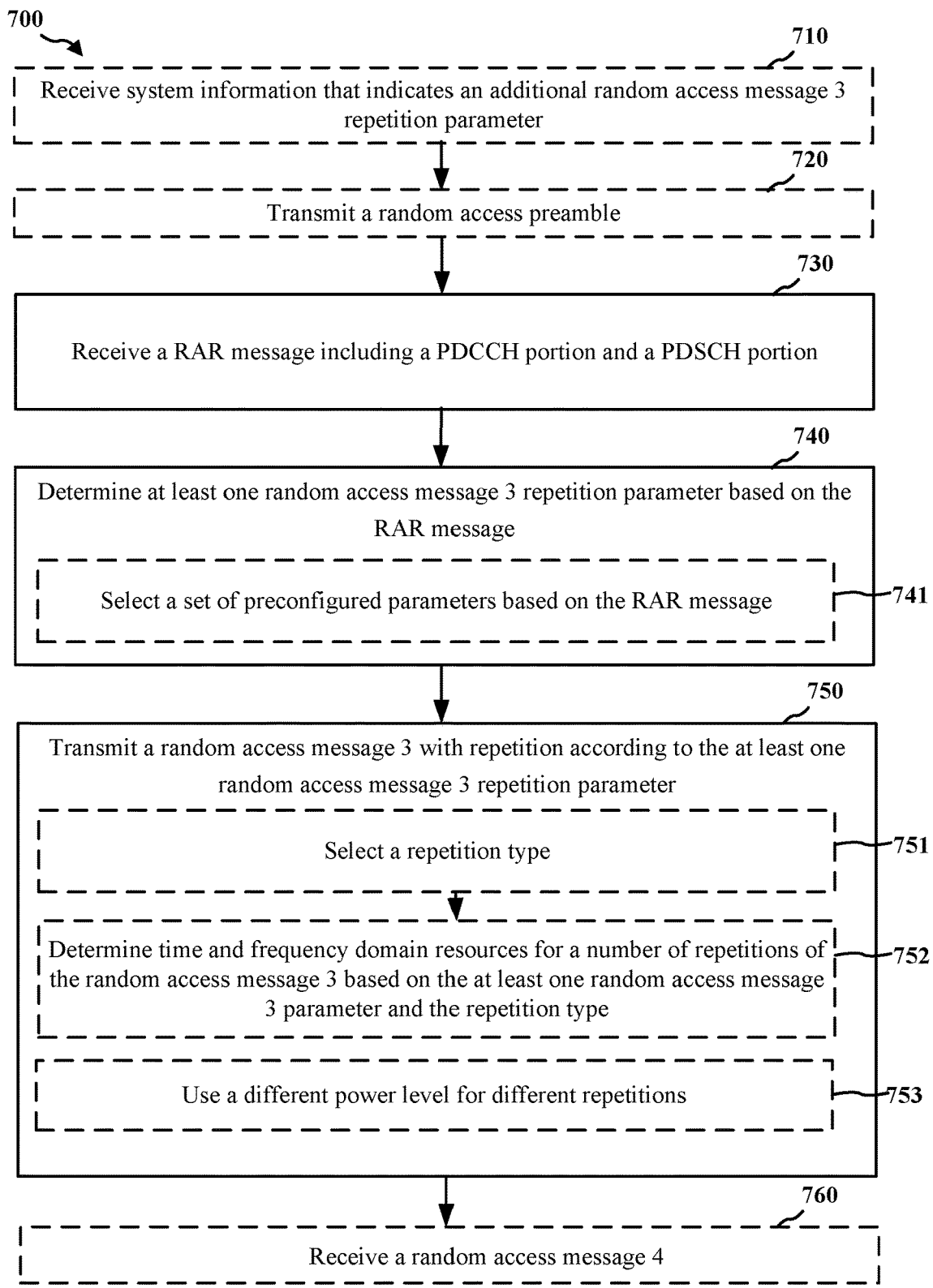
FIG. 7 is a flowchart of an example method for transmitting a random access message 3 during a RACH procedure according to aspects of the present disclosure.

FIG. 7 is a flowchart of an example method 700 for transmitting a random access message 3 during a RACH procedure. The method 700 may be performed by a UE (such as the UE 104, which may include the memory 360 and which may be the entire UE 104 or a component of the UE 104 such as the UE RACH component 140, TX processor 368, the RX processor 356, or the controller/processor 359). The method 700 may be performed by the UE RACH component 140 in communication with the BS RACH component 120 of the base station 102.

In block 710, the method 700 may optionally include receiving system information that indicates an additional random access message 3 repetition parameter. In an aspect, for example, the UE 104, the RX processor 356 or the controller/processor 359 may execute the UE RACH component 140 or the receiving component 148 to receive system information 406 that indicates an additional random access message 3 repetition parameter. For example, the system information 406 may be RMSI. The RMSI may include one or more additional random access message 3 repetition parameters to use in response to determining to apply repetition based on the RAR message 420. Accordingly, the UE 104, RX processor 356, or the controller/processor 359 executing the UE RACH component 140 or the receiving component 148 may provide means for receiving system information that indicates an additional random access message 3 repetition parameter.

In block 720, the method 700 may include transmitting a random access preamble. In an aspect, for example, the UE 104, the TX processor 368 or the controller/processor 359 may execute the UE RACH component 140 or the transmitting component 148 to transmit a random access preamble (e.g., Msg1 410 or 412). In some implementations, UE 104 may use a coverage-enhanced transmission method for the Msg 1 410 or 412. For instance, the UE 104 may repeat transmission of the Msg 1 410 on different ROs. As another example, the Msg 1 410 may follow a pattern to request coverage enhancement. For example, the UE 104 may indicate a request for coverage enhancement based on one or a combination of: time resources of the Msg 1, format of the Msg 1, or a sequence of the Msg 1. For example, a subset of the available PRACH sequences may be associated with coverage enhancement. Accordingly, the UE 104, TX processor 368, or the controller/processor 359 executing the UE RACH component 140 or the transmitting component 148 may provide means for transmitting a random access preamble.

In block 730, the method 700 may include receiving a RAR message including a PDCCH portion and a PDSCH portion. In an aspect, for example, the UE 104, the RX processor 356 or the controller/processor 359 may execute the UE RACH component 140 or the receiving component 148 to receive the RAR message 420 including the PDCCH portion 422 and a PDSCH portion 424. For example, the RAR receiving component 142 may receive the PDCCH portion 422 of the random access message 2, determine that a CRC of a DCI on the PDCCH is scrambled with a RA-RNTI, determine a corresponding PDSCH transport block, pass the transport block to higher layers, and receive the PDSCH portion 424 of the random access message 2 from the higher layers. Accordingly, the UE 104, RX processor 356, or the controller/processor 359 executing the UE RACH component 140 or the receiving component 148 may provide means for receiving a RAR message including a PDCCH portion and a PDSCH portion.

In block 740, the method 700 may include determining at least one random access message 3 repetition parameter based on the RAR message. In an aspect, for example, the UE 104, the TX processor 368 or the controller/processor 359 may execute the UE RACH component 140 or the repetition component 144 to determine at least one random access message 3 repetition parameter based on the RAR message 420. In some implementations, the PDCCH portion 422 includes a bit field that indicates the at least one random access message 3 repetition parameter. The bit field may be a single bit that indicates repetition of the random access message 3. The repetition component 144 may determine additional random access message 3 repetition parameters in response to the indication of repetition. For instance, in implementations including block 710, the repetition component 144 may determine the additional random access message 3 repetition parameters based on the system information 406. For example, in sub-block 741, the repetition component 144 may select a set of preconfigured parameters based on the RAR message 420. In some implementations, the PDSCH portion 424 includes the at least one random access message 3 repetition parameter. Accordingly, the UE 104, TX processor 368, or the controller/processor 359 executing the UE RACH component 140 or the repetition component 144 may provide means for determining at least one random access message 3 repetition parameter based on the RAR message.

In block 750, the method 700 may include transmitting a random access message 3 with repetition according to the at least one random access message 3 repetition parameter. In an aspect, for example, the UE 104, the controller/processor 359, or the TX processor 368 may execute the UE RACH component 140 or the transmitting component 146 to transmit the random access message 3 with repetition according to the at least one random access message 3 repetition parameter. For example, the transmitting component 146 may repeat the message 3 based on the number of repetitions. For instance, the transmitting component 146 may follow either PUSCH repetition type A or PUSCH repetition type B based on the number of repetitions (K). For instance, in sub-block 751, the block 750 may include selecting a repetition type. The repetition type may be indicated in the PDCCH portion 422, the PDSCH portion 424, or the system information 406. In some implementations, the UE 104 may select the repetition type, for example, selecting the repetition type is based on at least one of frequency range, subcarrier spacing, or payload size of the random access message 3. In some implementations, selecting the repetition type is based on system information 406. In some implementations, selecting the repetition type is based on the RAR message. In sub-block 752, in response to the sub-block 752, the block 750 may include determining time and frequency domain resources for a number of repetitions of the random access message 3 based on the at least one random access message 3 parameter and the repetition type. In some implementations, transmitting the random access message 3 for the number of repetitions may include transmitting the repetitions using a frequency hopping pattern based on a frequency offset indicated by the RAR message 420. In some implementations, in sub-block 753, the block 750 may include using a different power level for different repetitions. For instance, the at least one random access message 3 repetition parameter may indicate a change in the power level between repetitions (e.g., for ramping up or ramping down the power level). Accordingly, the UE 104, TX processor 368 or the controller/processor 359 executing the UE RACH component 140 or the repetition component 144 may provide means for transmitting a random access message 3 with repetition according to the at least one random access message 3 repetition parameter.

In block 760, the method 700 may optionally include receiving a random access message 4. In an aspect, for example, the UE 104, the RX processor 356 or the controller/processor 359 may execute the UE RACH component 140 or the receiving component 148 to receive a random access message 4 (e.g., Msg4 450). Accordingly, the UE 104, the RX processor 356, or the controller/processor 359 executing the UE RACH component 140 or the receiving component 148 may provide means for receiving a random access message 4.

Figure 8:
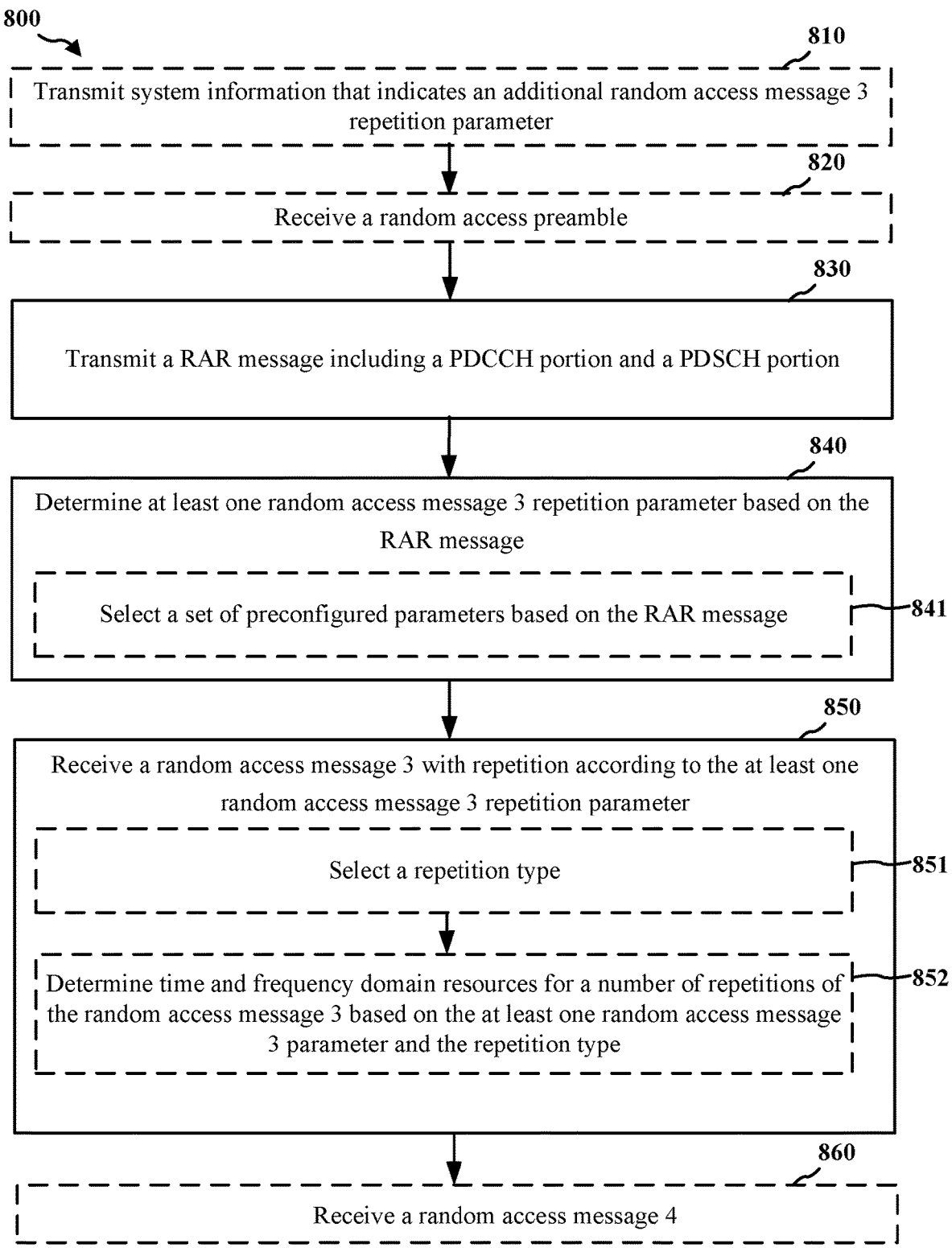
FIG. 8 is a flowchart of an example method for receiving a random access message 3 during a RACH procedure according to aspects of the present disclosure.

FIG. 8 is a flowchart of an example method 800 for receiving a random access message 3 during a RACH procedure. The method 800 may be performed by a base station (such as the base station 102, which may include the memory 376 and which may be the entire base station 102 or a component of the base station 102 such as the BS RACH component 120, TX processor 316, the RX processor 370, or the controller/processor 375). The method 800 may be performed by the BS RACH component 120 in communication with the UE RACH component 140 of the UE 104.

In block 810, the method 800 may optionally include transmitting system information that indicates an additional random access message 3 repetition parameter. In an aspect, for example, the base station 102, the TX processor 316, or the controller/processor 375 may execute the BS RACH component 120 or the transmitting component 128 to transmit the system information 406 (e.g., RMSI) that indicates an additional random access message 3 repetition parameter. For example, the additional random access message 3 repetition parameter may be applicable when the RAR message 420 indicates random access message 3 repetition. Accordingly, the base station 102, the TX processor 316, or the controller/processor 375 executing the BS RACH component 120 or the transmitting component 128 may provide means for transmitting system information that indicates an additional random access message 3 repetition parameter.

In block 820, the method 800 may include receiving a random access preamble. In an aspect, for example, the base station 102, the RX processor 370, or the controller/processor 375 may execute the BS RACH component 120 or the receiving component 126 to receive the random access preamble (e.g., Msg 1 410 or 412). Accordingly, the base station 102, the RX processor 370, or the controller/processor 375 executing the BS RACH component 120 or the receiving component 126 may provide means for receiving a random access preamble.

In block 830, the method 800 may include transmitting a RAR message including a PDCCH portion and a PDSCH portion. In an aspect, for example, the base station 102, the TX processor 316, or the controller/processor 375 may execute the BS RACH component 120 or the transmitting component 128 to transmit the RAR message 420 including the PDCCH portion 422 and the PDSCH portion 424. The random access message 2 may include a field that is set based on a random access message 3 repetition parameter. Accordingly, the base station 102, the TX processor 316, or the controller/processor 375 executing the BS RACH component 120 or the transmitting component 128 may provide means for transmitting a RAR message including a PDCCH portion and a PDSCH portion.

In block 840, the method 800 may include determining at least one random access message 3 repetition parameter based on the RAR message. In an aspect, for example, the base station 102, the RX processor 370, or the controller/processor 375 may execute the BS RACH component 120 or the repetition parameter component 124 to determine at least one random access message 3 repetition parameter based on the RAR message 420. In some implementations, the PDCCH portion 422 includes a bit field that indicates the at least one random access message 3 repetition parameter. The bit field may be a single bit that indicates repetition of the random access message 3. The repetition parameter component 124 may determine additional random access message 3 repetition parameters in response to the indication of repetition. For instance, in implementations including block 810, the repetition parameter component 124 may determine the additional random access message 3 repetition parameters based on the system information 406. For example, in sub-block 841, the repetition parameter component 124 may select a set of preconfigured parameters based on the RAR message 420. In some implementations, the PDSCH portion 424 includes the at least one random access message 3 repetition parameter. Accordingly, the base station 102, the RX processor 370, or the controller/processor 375 executing the BS RACH component 120 or the repetition parameter component 124 may provide means for determining at least one random access message 3 repetition parameter based on the RAR message.

In block 850, the method 800 may include receiving a random access message 3 with repetition according to the at least one random access message 3 repetition parameter. In an aspect, for example, the base station 102, the RX processor 370, or the controller/processor 375 may execute the BS RACH component 120 or the receiving component 126 to receive a random access message 3 with repetition according to the at least one random access message 3 repetition parameter. For example, the random access message 3 440 may be repeated based on the number of repetitions. For instance, the random access message 3 440 may follow either PUSCH repetition type A or PUSCH repetition type B based on the number of repetitions (K). For instance, in sub-block 851, the block 850 may include selecting a repetition type. The repetition type may be indicated in the PDCCH portion 422, the PDSCH portion 424, or the system information 406. In some implementations, the base station 102 may select the repetition type for the random access message 3 440, for example, based on at least one of frequency range, subcarrier spacing, or payload size of the random access message 3. In some implementations, selecting the repetition type is based on system information 406. In some implementations, selecting the repetition type is based on the RAR message 420. In sub-block 852, in response to the sub-block 852, the block 850 may include determining time and frequency domain resources for a number of repetitions of the random access message 3 based on the at least one random access message 3 parameter and the repetition type. In some implementations, receiving the random access message 3 for the number of repetitions may include receiving the repetitions using a frequency hopping pattern based on a frequency offset indicated by the RAR message 420. Accordingly, the base station 102, the RX processor 370, or the controller/processor 375 executing the BS RACH component 120 or the receiving component 126 may provide means for receiving a random access message 3 with repetition according to the at least one random access message 3 repetition parameter.

In block 860, the method 800 may include transmitting a random access message 4. In an aspect, for example, the base station 102, the TX processor 316, or the controller/processor 375 may execute the BS RACH component 120 or the transmitting component 128 to transmit a random access message 4. In some implementations, the random access message 4 may be transmitted on a beam selected based on the received random access message 3 repetition. Accordingly, the base station 102, the TX processor 316, or the controller/processor 375 executing the BS RACH component 120 or the transmitting component 128 may provide means for transmitting a random access message 4.

Figure 9:
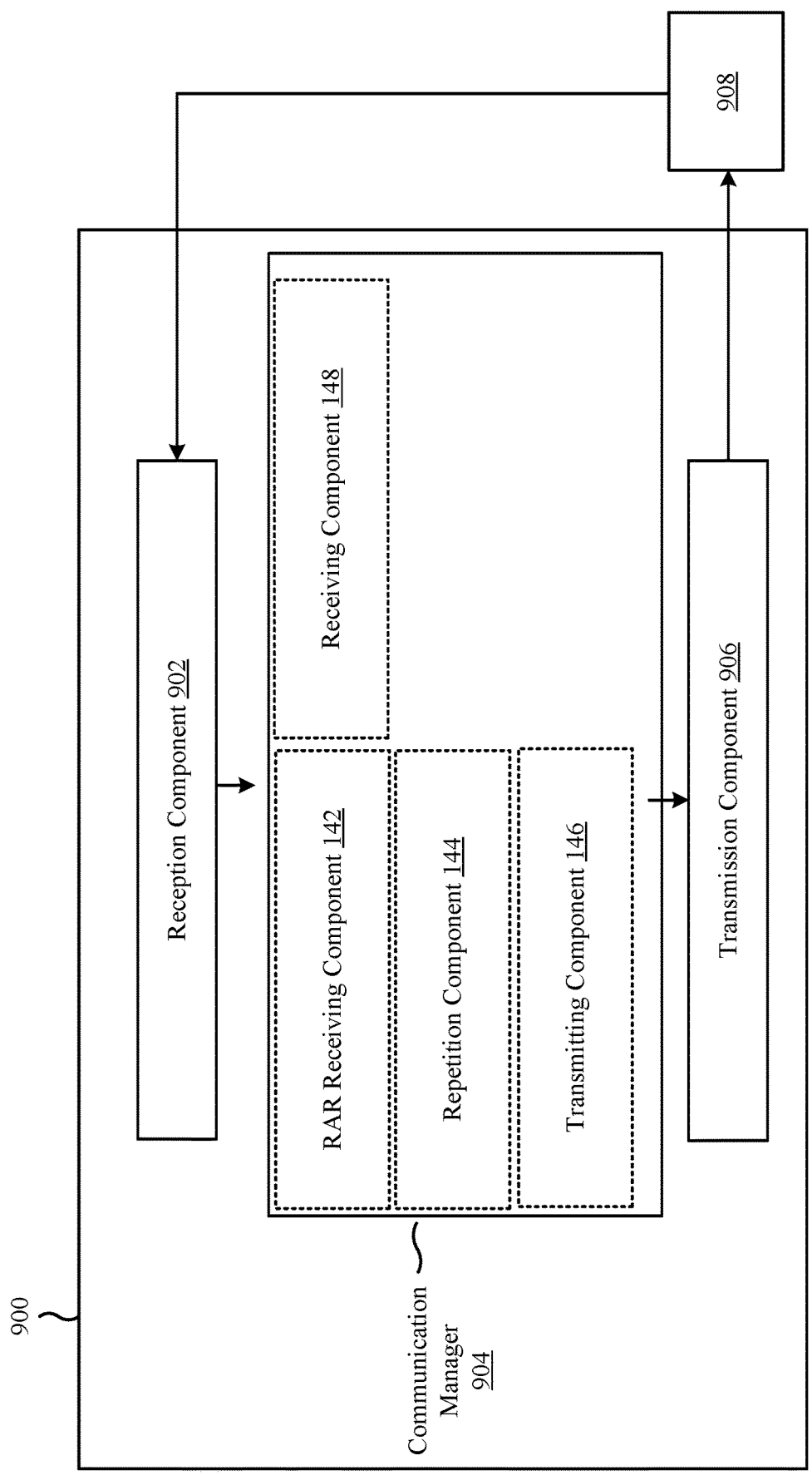
FIG. 9 is a block diagram of an example apparatus, such as a UE, for wireless communication according to aspects of the present disclosure.

FIG. 9 is a block diagram of an example apparatus 900 for wireless communication. The apparatus 900 may be a UE or a UE may include the apparatus 900. In some aspects, the apparatus 900 includes a reception component 902, a communication manager 904, and a transmission component 906, which may be in communication with one another (for example, via one or more buses). As shown, the apparatus 900 may communicate with another apparatus 908 (such as a UE, a base station, or another wireless communication device) using the reception component 902 and the transmission component 906.

In some aspects, the apparatus 900 may be configured to perform one or more operations described herein in connection with FIGS. 4-6. Additionally or alternatively, the apparatus 900 may be configured to perform one or more processes described herein, such as method 700 of FIG. 7. In some aspects, the apparatus 900 may include one or more components of the UE described above in connection with FIG. 1.

The reception component 902 may receive communications, such as reference signals, control information, data communications, or a combination thereof, from the apparatus 908. The reception component 902 may provide received communications to one or more other components of the apparatus 900, such as the communication manager 904. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 902 may include one or more antennas, a demodulator, a MIMO detector, a receive processor, a controller/processor, a memory, or a combination thereof, of the UE described above in connection with FIG. 1.

The transmission component 906 may transmit communications, such as reference signals, control information, data communications, or a combination thereof, to the apparatus 908. In some aspects, the communication manager 904 may generate communications and may transmit the generated communications to the transmission component 906 for transmission to the apparatus 908. In some aspects, the transmission component 906 may perform signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 906 may include one or more antennas, a modulator, a transmit MIMO processor, a transmit processor, a controller/processor, a memory, or a combination thereof, of the UE described above in connection with FIG. 1. In some aspects, the transmission component 906 may be collocated with the reception component 902 in a transceiver.

The communication manager 904 may transmit a random access preamble with coverage enhancement; receive a random access message 2; determine at least one random access message 3 repetition parameter based on at least one property of the random access preamble; transmit a random access message 3 with repetition according to the at least one random access message 3 repetition parameter; and receive a random access message 4. In some aspects, the communication manager 904 may include a controller/processor, a memory, or a combination thereof, of the UE described above in connection with FIG. 1.

In some aspects, the communication manager 904 may include a set of components, such as a RAR receiving component 142, a repetition component 144, a transmitting component 146, a receiving component 148 or a combination thereof. Alternatively, the set of components may be separate and distinct from the communication manager 904. In some aspects, one or more components of the set of components may include or may be implemented within a controller/processor, a memory, or a combination thereof, of the UE described above in connection with FIG. 1. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The RAR receiving component 142 may receive a RAR message that includes a PDCCH portion and a PDSCH portion. The repetition component 144 determine at least one random access message 3 repetition parameter based on the RAR message. The transmitting component 146 may transmit a random access message 3 with repetition according to the at least one random access message 3 repetition parameter. The receiving component 148 may receive a random access message 4.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

FIG. 10 is a block diagram of an example apparatus 1000 for wireless communication. The apparatus 1000 may be a base station or a base station may include the apparatus 1000. In some aspects, the apparatus 1000 includes a reception component 1002, a communication manager 1004, and a transmission component 1006, which may be in communication with one another (for example, via one or more buses). As shown, the apparatus 1000 may communicate with another apparatus 1008 (such as a UE, a base station, or another wireless communication device) using the reception component 1002 and the transmission component 1006.

In some aspects, the apparatus 1000 may be configured to perform one or more operations described herein in connection with FIGS. 4-6. Additionally or alternatively, the apparatus 1000 may be configured to perform one or more processes described herein, such as method 800 of FIG. 8. In some aspects, the apparatus 1000 may include one or more components of the base station described above in connection with FIG. 1.

The reception component 1002 may receive communications, such as reference signals, control information, data communications, or a combination thereof, from the apparatus 1008. The reception component 1002 may provide received communications to one or more other components of the apparatus 1000, such as the communication manager 1004. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1002 may include one or more antennas, a demodulator, a MIMO detector, a receive processor, a controller/processor, a memory, or a combination thereof, of the base station described above in connection with FIG. 1.

The transmission component 1006 may transmit communications, such as reference signals, control information, data communications, or a combination thereof, to the apparatus 1008. In some aspects, the communication manager 1004 may generate communications and may transmit the generated communications to the transmission component 1006 for transmission to the apparatus 1008. In some aspects, the transmission component 1006 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1006 may include one or more antennas, a modulator, a transmit MIMO processor, a transmit processor, a controller/processor, a memory, or a combination thereof, of the base station described above in connection with FIG. 1. In some aspects, the transmission component 1006 may be collocated with the reception component 1002 in a transceiver.

The communication manager 1004 may transmit a RAR message including a PDCCH portion and a PDSCH portion; determine at least one random access message 3 repetition parameter based on the RAR message; and receive a random access message 3 with repetition according to the at least one random access message 3 repetition parameter. In some aspects, the communication manager 904 may include a controller/processor, a memory, a scheduler, a communication unit, or a combination thereof, of the base station described above in connection with FIG. 1.

In some aspects, the communication manager 1004 may include a set of components, such as a RAR transmitting component 122, a repetition parameter component 124, a receiving component 126, and a transmitting component 128, or a combination thereof. Alternatively, the set of components may be separate and distinct from the communication manager 1004. In some aspects, one or more components of the set of components may include or may be implemented within a controller/processor, a memory, a scheduler, a communication unit, or a combination thereof, of the base station described above in connection with FIG. 1. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The RAR transmitting component 122 may transmit a RAR message including a PDCCH portion and a PDSCH portion. The repetition parameter component 124 may determine at least one random access message 3 repetition parameter based on the RAR message. The receiving component 126 may receive a random access message 3 with repetition according to the at least one random access message 3 repetition parameter. The transmitting component 128 may transmit the random access message 4.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally or alternatively, a set of (one or more) components shown in FIG. 10 may perform one or more functions described as being performed by another set of components shown in FIG. 1.

Figure 11:
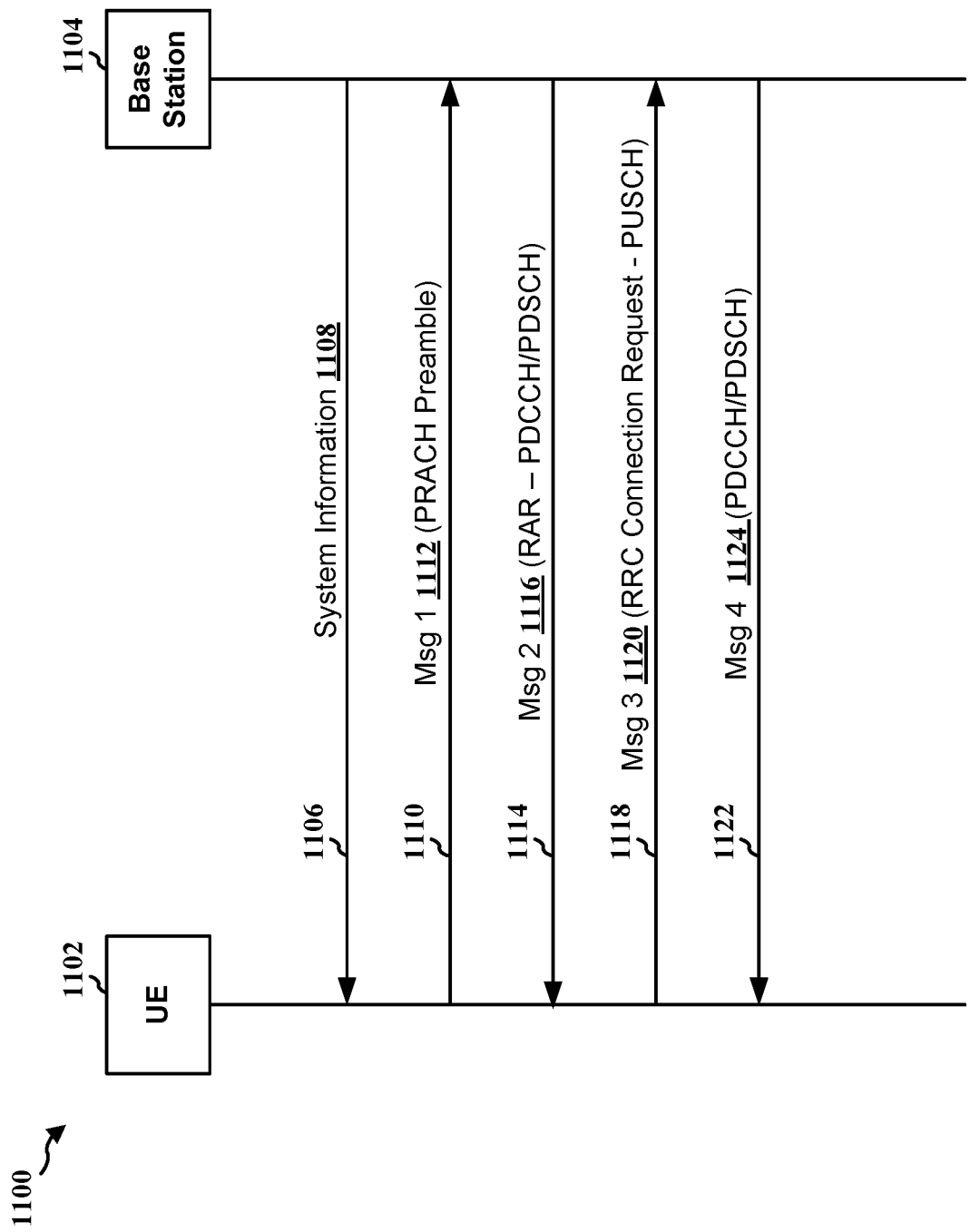
FIG. 11 is a communication flow illustrating an example of a RACH procedure.

A UE may initiate a random access channel (RACH) procedure in order to communicate with a base station. For example, the UE may use the RACH procedure to request a radio resource control (RRC) connection, to re-establish an RRC connection, and/or to resume an RRC connection, etc. FIG. 11 is a communication flow 1100 illustrating an example of a RACH procedure. As shown at 1110, a UE 1102 may initiate a RACH procedure by sending, to a base station 1104, a first random access message 1112 (e.g., message one (1) or Msg1), which may include a preamble. Prior to sending the first random access message 1112, as shown at 1106, the UE 1102 may obtain one or more random access parameters, e.g., including preamble format parameters, time and frequency resources, parameters for determining root sequences and/or cyclic shifts for a random access preamble, etc., in a system information message 1108 transmitted/broadcasted from the base station 1104. The first random access message 1112 (e.g., the preamble) may be transmitted with an identifier, such as a random access radio network temporary identifier (RA-RNTI). The UE 1102 may randomly select a random access preamble sequence, e.g., from a set of preamble sequences. In some examples, a preamble sequence may be assigned to the UE 1102.

As shown at 1114, in response to the first random access message 1112, the base station 1104 may transmit a second random access message 1116 (e.g., message two (2) or Msg2) to the UE 1102 via a PDSCH that may include a random access response (RAR). The RAR may include, e.g., an identifier of the random access preamble sent by the UE 1102, a timing advance (TA), an uplink grant for the UE 1102 to transmit data, a cell radio network temporary identifier (C-RNTI) or other identifier(s), and/or a back-off indicator. At 1118, after receiving the second random access message 1116 (e.g., the RAR), the UE 1102 may transmit a third random access message 1120 (e.g., message three (3) or Msg3) to the base station 1104, e.g., using a PUSCH, that may include an RRC connection request, an RRC connection re-establishment request, or an RRC connection resume request, depending on the trigger for initiating the random access procedure. The base station 1104 may then complete the random access procedure by sending a fourth random access message 1122 (e.g., message four (4) or Msg4) to the UE 1102, e.g., using a PDCCH for scheduling and PDSCH for the message, such as shown at 1122. The fourth random access message 1124 may include a random access response message that includes timing advancement information, contention resolution information, and/or RRC connection setup information. The UE 1102 may monitor for PDCCH, e.g., with the C-RNTI. If a monitored PDCCH is successfully decoded, the UE 1102 may also decode a PDSCH associated with the PDCCH. The UE 1102 may send HARQ feedback for data carried in the fourth random access message 1124. In some examples, the fourth random access message 1124 may be referred to as a contention resolution message. The fourth random access message 1124 may complete the random access procedure. Thus, the UE 1102 may then transmit uplink communication and/or receive downlink communication with the base station 1104 based on the RAR and the fourth random access message 1124. As four random access messages may be involved during the RACH procedure, the RACH procedure may also be referred to as a four-step RACH procedure.

To improve data transmission and a successful data transmission rate, a transmitting device, such as a base station or a UE, may transmit data (e.g., PDSCH, PUSCH, etc.) with repetitions/retransmissions (e.g., PDSCH repetitions, PUSCH repetitions, etc.). For example, a UE may be configured to transmit a PUSCH followed by N (e.g., 2, 4, 5, etc.) repetitions. Thus, after the UE transmits the PUSCH, the UE may transmit N PUSCHs. Transmitting data with repetitions of the data may increase the success rate of the transmission, as the data may have a higher chance of being received by a receiving device. For purpose of the present disclosure, the term "repetition" and the term "retransmission" may be used interchangeably, which may refer to a copy or a duplication of data that may be transmitted more than once. For example, a PUSCH repetition and a PUSCH retransmission may both refer to a copy/duplication of a PUSCH that is transmitted by a UE after the UE transmits the PUSCH.

Figure 12:
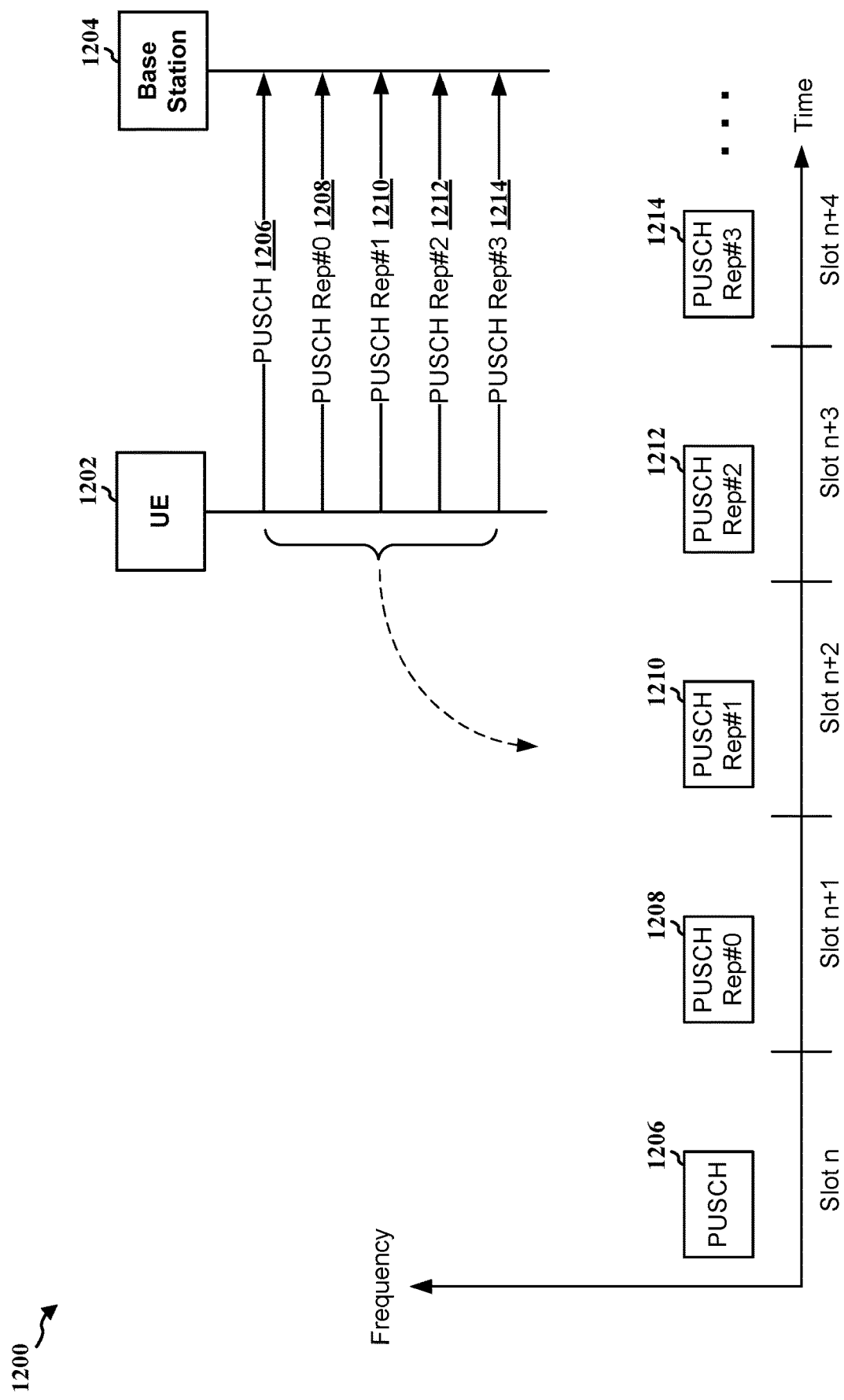
FIG. 12 is a diagram illustrating an example of a data transmission involving repetitions according to aspects of the present disclosure.

FIG. 12 is a diagram 1200 illustrating an example of a data transmission involving repetitions according to aspects of the present disclosure. A UE 1202 may be configured to transmit a PUSCH 1206 with four (4) repetitions/retransmissions to a base station 1204. The UE 1202 may be configured to transmit more or less than 4 repetitions/retransmissions. The UE 1202 may transmit the PUSCH 1206 at slot n, then the UE 1202 may transmit a first PUSCH repetition 1208 (e.g., repetition #0) at slot n+1, a second PUSCH repetition 1210 (e.g., repetition #1) at slot n+2, a third PUSCH repetition 1212 (e.g., repetition #2) at slot n+3, and a fourth PUSCH repetition 1214 (e.g., repetition #3) at slot n+4. The repeated transmission of the PUSCH 1206 may be referred to as inter-slot repetitions. While the diagram 1200 shows the repetitions (e.g., PUSCH repetitions 1208, 1210, 1212, and 1214) of the PUSCH 1206 being transmitted on consecutive slots, the repetitions may also be transmitted at non-consecutive slots (e.g., at n+1, n+3, n+5, etc.) or within a same slot (e.g., intra-slot repetitions).

At times, noise at a frequency region/band may be high, which may corrupt or degrade data transmissions within the frequency region. For example, when a frequency band used for transmitting the PUSCH 1206 and/or the PUSCH repetitions is experiencing a worsened or a below an average channel condition (e.g., a high noise level), the transmission of the PUSCH 1206 and/or the PUSCH repetitions from the UE 1202 to the base station 1204 may not be successful. To reduce or avoid an unsuccessful data transmission when a frequency band used for the data transmission encounters a high noise level, a transmitting device (e.g., the UE 1202 or the base station 1204) may apply frequency hopping or a frequency hopping spread spectrum (FHSS) to the data transmission. Under the frequency hopping, instead of transmitting data using a single frequency band, the transmitting device may transmit the data using multiple frequency bands. For example, the transmitting device may transmit a first portion of the data using a first frequency band, a second portion of the data using a second frequency band, a third portion of the data using a third frequency band, etc. In other words, frequency hopping is a transmission technique in which the data signal may be modulated by a narrowband carrier signal which changes frequency ("hops") over a wide band of frequencies.

Figure 13:
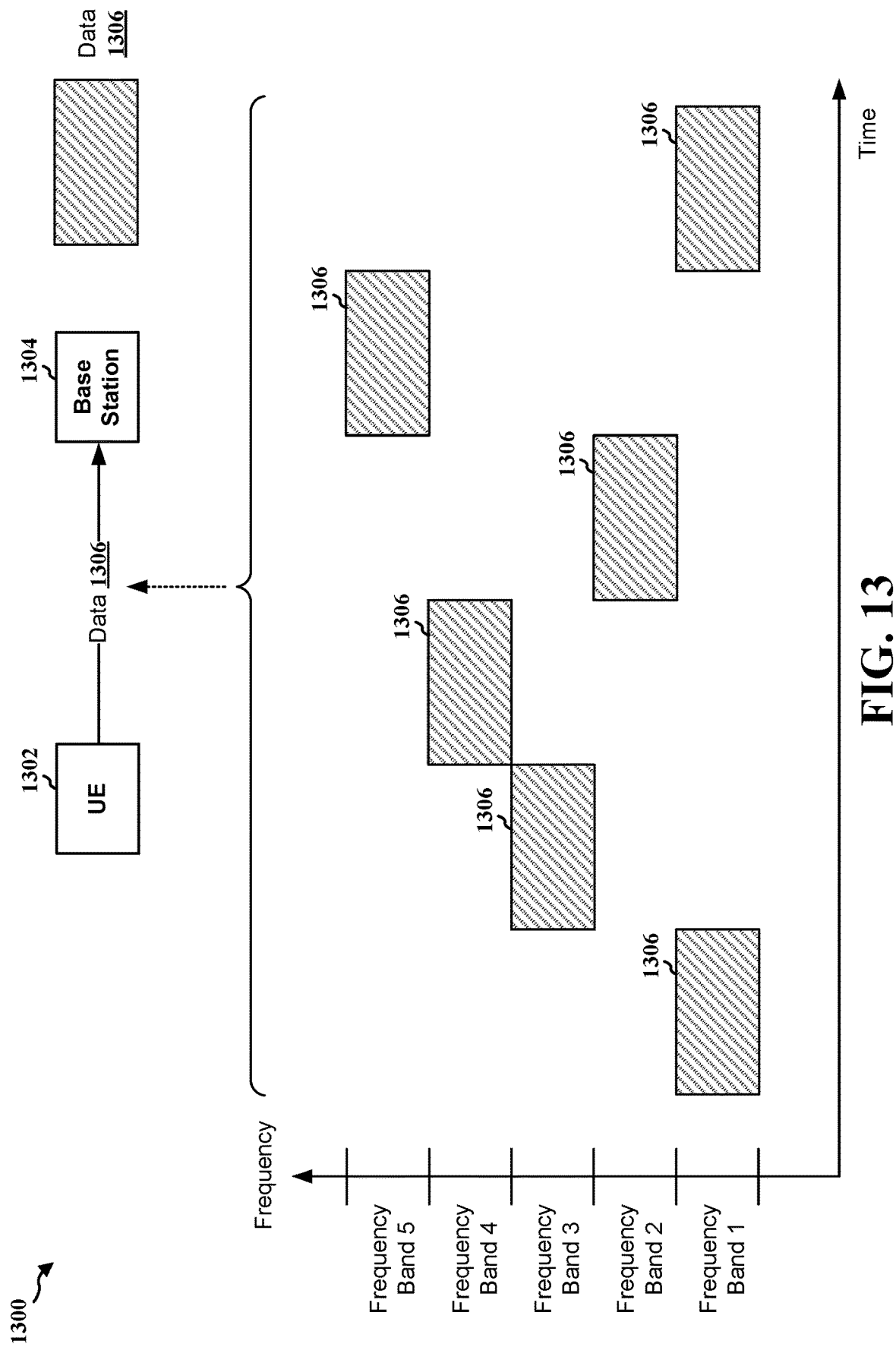
FIG. 13 is a diagram illustrating an example of frequency hopping according to aspects of the present disclosure.

FIG. 13 is a diagram 1300 illustrating an example of frequency hopping according to aspects of the present disclosure. A UE 1302 may transmit data 1306 to a base station 1304 using different frequency resources (e.g., bands) and time resources (e.g., at different slots or within slots). For example, the UE 1302 may transmit a first portion of the data 1306 using a first frequency band (e.g., Frequency Band 1), a second portion of the data 1306 using a third frequency band (e.g., Frequency Band 3), a third portion of the data 1306 using a fourth frequency band (e.g., Frequency Band 4), a fourth portion of the data 1306 using a second frequency band (e.g., Frequency Band 2), a fifth portion of the data 1306 using a fifth frequency band (e.g., Frequency Band 5), and a sixth portion of the data 1306 using the first frequency band (e.g., Frequency Band 1), etc. By transmitting the data 1306 over different frequencies, transmission failure caused by heavy noise at a specific frequency region may be reduced or avoided. For example, if the third frequency band (e.g., Frequency Band 3) encounters a high noise level, the UE 1302 may still be able to successfully transmit other portions of the data 1306 to the base station 1304 through other frequency bands.

Figure 14A:
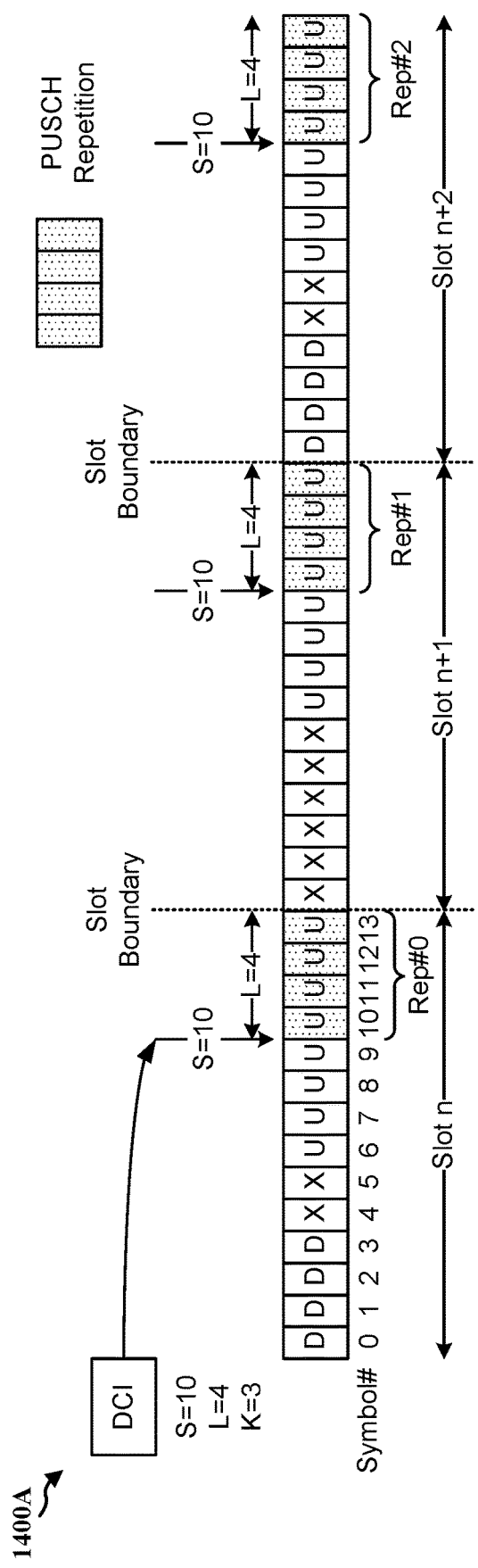
FIGS. 14A and 14B are diagrams illustrating examples of PUSCH repetitions according to aspects of the present disclosure.

In some examples, a network may include different data repetition types or modes. In one example, a network may define two types of PUSCH repetition for its dynamic grant (DG) and/or configured grant (CG). As shown by a diagram 1400A of FIG. 14A, under a first type of PUSCH repetition, which may be referred to as "PUSCH repetition Type A," a UE may be configured to transmit a number K of PUSCH repetitions using the same time and frequency resources in each slot when more than one PUSCH repetition (e.g., K>1) is configured for the UE, and the UE may not transmit a PUSCH or a PUSCH repetition across a slot boundary for DG PUSCH and/or CG PUSCH. When a UE is scheduled by a base station to transmit PUSCH or PUSCH repetition, the base station may indicate to the UE resources in which the UE may use for transmitting the PUSCH or the PUSCH repetition. For example, the base station may transmit a start and length indicator value (SLIV) to the UE, where the SLIV may indicate/include a starting symbol (S) and a length (L) of PUSCH (e.g., in symbols) in which the UE may use for transmitting the PUSCH or the PUSCH repetition in a slot. For example, as shown by the diagram 1400A, a base station may configure a UE to transmit three (3) PUSCH repetitions (e.g., K=3), and the base station may provide the UE with an SLIV that indicates S=10 and L=4. Based on the SLIV, the UE may determine that it may use four (4) symbols starting from symbol #10 (e.g., the eleventh symbol) of a slot (e.g., a slot n) for transmitting a PUSCH or a PUSCH repetition. When the UE is configured to transmit more than one PUSCH repetition (e.g., K>1), the UE may apply the same SLIV for all PUSCH repetitions, such that each PUSCH repetition may be transmitted using the same time and frequency resources of a slot. In other words, the UE may transmit a number of repetitions across consecutive slots, and each slot may include one repetition and the time domain for the repetitions may be the same in those slots, such as shown by the diagram 1400A. The base station may indicate the number of PUSCH repetitions K for a PUSCH to a UE dynamically via downlink control information (DCI).

Figure 14B:
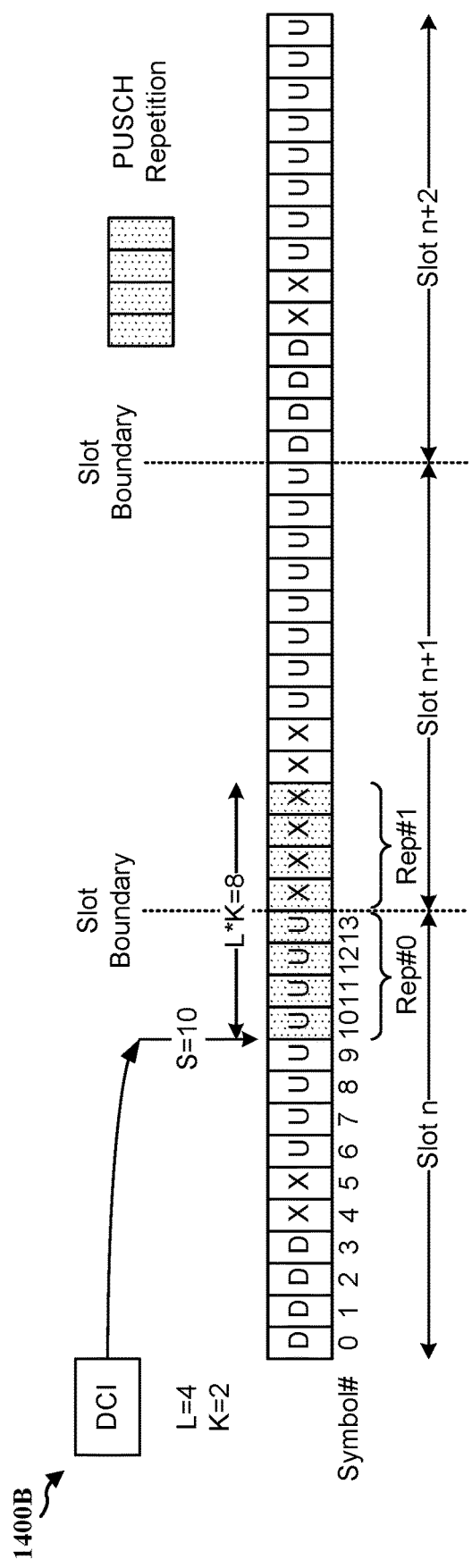

Under a second type of PUSCH repetition, which may be referred to as "PUSCH repetition Type B," a UE may transmit PUSCH across a slot boundary for DG PUSCH and/or CG PUSCH, and the UE may transmit PUSCH or PUSCH repetition using different time and/or frequency resources for different slots. A base station may also dynamically indicate the number of PUSCH repetitions, an inter-nominal PUSCH frequency hopping, new uplink/downlink (U/D) symbol interaction, and/or new SLIV to the UE under the second type of PUSCH repetition. For example, as shown by a diagram 1400B of FIG. 14B, a base station may configure a UE (e.g., via DCI) to transmit two (2) PUSCH repetitions (e.g., K=nominal repetitions=2), and the base station may provide to the UE with an SLIV that indicates S=10 and L=4 for transmitting PUSCH or PUSCH repetition. Based on the value K and the SLIV, the UE may use eight (8) symbols (8=K×L=2×4) starting from the symbol #10 (e.g., the eleventh symbol) of a slot for transmitting two PUSCH repetitions. Thus, under the second type of PUSCH repetition, the UE may transmit the first PUSCH repetition (e.g., repetition #0) and the second PUSCH repetition (e.g., repetition #1) using consecutive symbols and cross slots (e.g., using four symbols of the slot n and four symbols of the slot n+1), such that the two PUSCH repetitions may be transmitted back-to-back starting from the symbol #10.

As wireless technology continues to grow, higher frequency bands above FR2 (e.g., 24.25 GHz-122.6 GHz) may be used, including in the sub-Terahertz (sub-THz) bands above 140 GHz or between 300 GHz and 3 THz, etc. The higher frequency radio technology, such as the sub-THz frequency range, may enable much narrower beam structures compared to the beam structures under FR2 or below because more radiating elements may be placed per given area at the antenna due to smaller wavelength. The higher-frequency band may have short delay spread (e.g., few nanoseconds) and may be translated into coherence frequency bandwidth of 10's of MHz. As such, a higher operating frequency band may enable a UE to communicate with a base station or with another UE using larger bandwidths with higher throughput. However, transmissions between a UE and a base station using a larger bandwidth and/or at a higher operating frequency may encounter higher phase noise as the communication between the UE and the base station may be more likely to become out of phase with each other. In addition, a transmission using a higher frequency band may have a shorter transmission range compare to a transmission using a lower frequency band. Thus, the coverage and/or the reliability of a transmission at a higher frequency band may be reduced compared to the coverage and/or the reliability of a transmission at a lower frequency band. For example, referring back to FIG. 11, when the UE 1102 transmits a third random access message 1120 (e.g., Msg3) to the base station 1104 using a higher frequency band, the transmission coverage and/or the reliability may be reduced compared to a transmission using a lower frequency band. This may cause a RACH procedure more likely to be unsuccessful if the RACH procedure is performed using a higher frequency band. Also, as described in connection with FIG. 12, when a transmitting device is transmitting data using a single frequency or a single frequency band, the transmission may fail when the frequency or the frequency band is facing a high noise level.

Aspects presented herein may enhance a RACH procedure, such as when the RACH procedure is performed between a UE and a base station at a higher frequency band. Aspects presented herein may improve data transmission coverage and/or the reliability for a UE and/or a base station during a RACH procedure, such that the UE may be more likely to complete the RACH procedure successfully. In one aspect of the present disclosure, to enhance of the coverage and performance of random access message transmissions, such as transmission of the third random access message (e.g., Msg3) for a four-step RACH procedure by a UE, the UE and/or a base station may transmit the random access message(s) with repetitions and/or with frequency hopping. For example, a UE may apply frequency hopping for Msg3 PUSCH repetitions based on receiving an indication from a base station.

Figure 15:
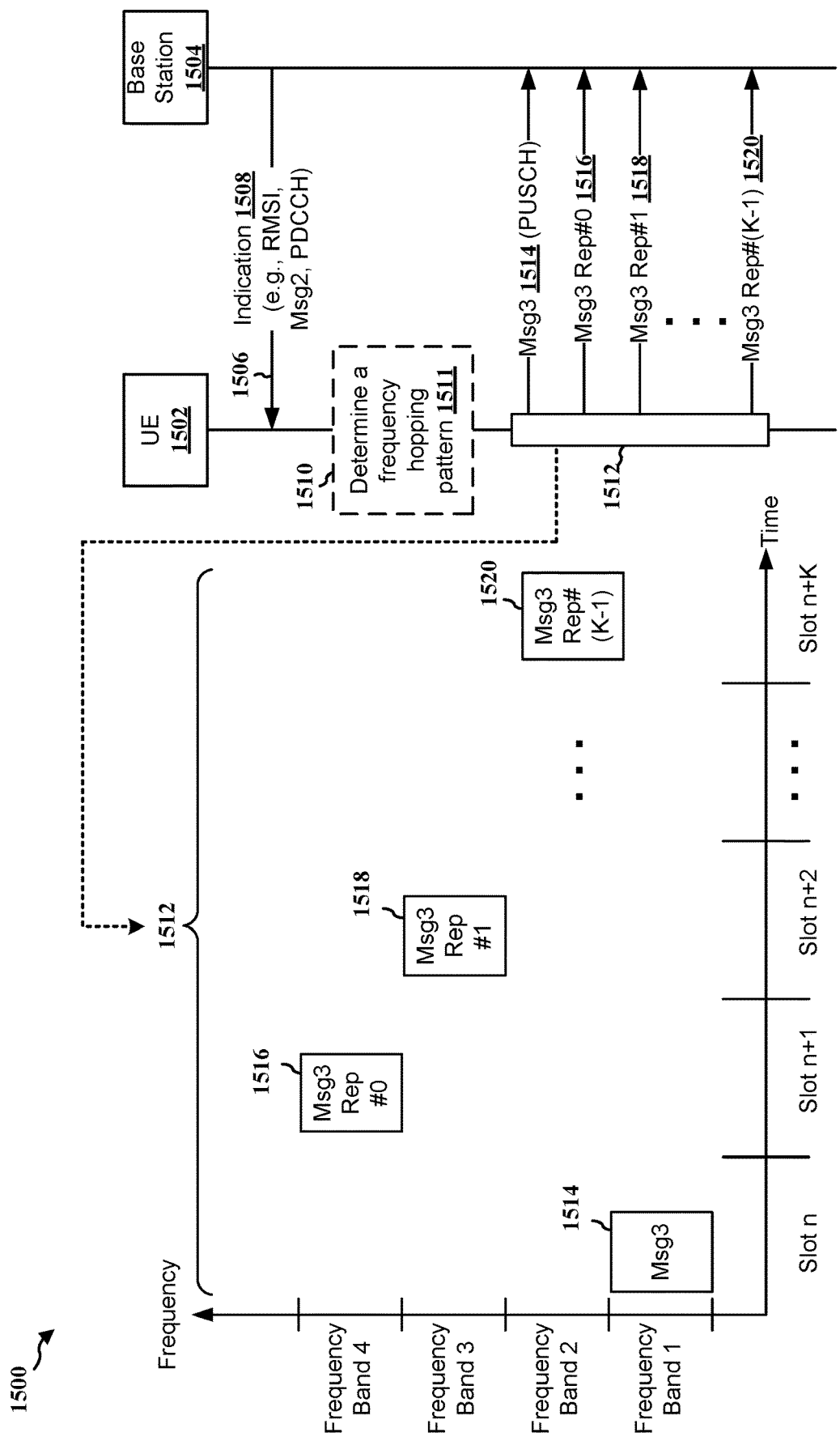
FIG. 15 is a diagram illustrating an example of a base station configuring a UE to transmit Msg3 PUSCH with repetitions and with frequency hopping according to aspects of the present disclosure.

FIG. 15 is a diagram 1500 illustrating an example of a base station configuring a UE to transmit Msg3 PUSCH with repetitions (i.e., retransmissions) and with frequency hopping according to aspects of the present disclosure. Optional aspects may be illustrated with a dashed line. As shown at 1506, a base station 1504 may transmit an indication 1508 to a UE 1502, where the indication 1508 may indicate to the UE 1502 to transmit Msg3 PUSCH with repetitions (e.g., retransmissions), and/or to apply frequency hopping for Msg3 PUSCH repetitions (e.g., if Msg3 PUSCH repetition is configured).

In one example, the base station 1504 may transmit the indication 1508 to the UE 1502 via a remaining minimum system information (RMSI) message, or via a Msg2 PDCCH or a Msg2 of a four-step RACH procedure (e.g., the second random access message 1116). In another example, the base station 1504 may transmit the indication 1506 indicating the frequency hopping (e.g., for Msg3 repetitions) using part of Msg2 (e.g., as part of Msg3 scheduling) to the UE 1502. In another example, the base station 1504 may transmit the indication 1506 for the frequency hopping (e.g., for Msg3 repetitions) using part of Msg2 PDCCH, e.g., using a 1-bit flag in the DCI to indicate to the UE 1502 whether to apply frequency hopping. In another example, the base station 1504 may transmit the indication 1506 indicating the frequency hopping (e.g., for Msg3 repetitions) using part of RMSI, and the UE 1502 may be configured to apply the frequency hopping based on whether the UE 1502 is configured to transmit PUSCH repetitions and/or number of PUSCH repetitions. In other words, the frequency hopping may be applied by the UE 1502 conditioned on indication of Msg3 repetition from the base station 1504 (e.g., indicated via Msg2). For example, if the base station 1504 indicates to the UE 1502 to apply repetition for Msg3 PUSCH, the UE may apply repetition for Msg3 PUSCH without receiving additional indication and/or when the number of repetitions exceeds a threshold (e.g., when the number of repetitions K>1), etc.

At 1510, after receiving the indication 1506 to apply frequency hopping for the Msg3 PUSCH repetitions, the UE 1502 may select a frequency hopping pattern 1511 for the frequency hopping that is to be applied to the Msg3 PUSCH repetitions. The frequency hopping pattern 1511 may indicate the way in which a frequency hopping operation is to be performed, such as the time and frequency resources (e.g., the hopping locations) used for the frequency hopping operation. For example, the frequency hopping pattern 1511 may configure the UE 1502 to transmit a first Msg3 PUSCH repetition using a first frequency band and a time resource in a first slot, to transmit a second Msg3 PUSCH repetition using a second frequency band and a time resource in a second slot, to transmit a third Msg3 PUSCH repetition using a third frequency band and a time resource in a third slot, and so on.

In one example, the frequency hopping pattern 1511 for the Msg3 PUSCH repetitions may be predefined or preconfigured, such as based on a specification as one or multiple options. For example, the UE 1502 may be configured with multiple frequency hopping patterns, and the base station 1504 may indicate to the UE 1502 which frequency hopping pattern to use for the frequency hopping of the Msg3 PUSCH repetitions. In other examples, the specification may alternatively, or additionally, define a rule for the UE 1502 to determine one or more frequency hopping patterns based at least in part on the frequency allocation of the first copy of Msg3 (e.g., the first Msg3 repetition) and/or other parameter(s) (e.g., resource block (RB) allocation of the associated bandwidth part, etc.). For example, if a first Msg3 PUSCH repetition is transmitted using a first frequency band (e.g., frequency band 4), the specification may define the second Msg3 PUSCH repetition is to be transmitted using a second frequency band and the third Msg3 PUSCH repetition is to be transmitted using a third frequency band, etc. The base station 1504 may configure the frequency hopping pattern 1511 for the UE 1502 through an RMSI message, and/or the base station 1504 may indicate the frequency hopping pattern 1511 to the UE 1502 via the Msg2.

In some examples, the UE 1502 may determine whether to apply frequency hopping for Msg3 PUSCH repetitions and/or the frequency hopping pattern 1511 that is to be applied to the frequency hopping for Msg3 PUSCH repetitions based at least in part on a repetition type associated with the Msg3 PUSCH repetition, such as whether PUSCH repetition Type A or PUSCH repetition Type B (e.g., as described in connection with FIGS. 14A and 14B) is configured for the Msg3 PUSCH repetition. For example, the UE 1502 may be configured to apply frequency hopping if PUSCH repetition Type A is used for the Msg3 PUSCH repetitions.

In other examples, the UE 1502 may determine whether to apply frequency hopping for Msg3 PUSCH repetitions and/or the frequency hopping pattern that is to be applied to the frequency hopping for Msg3 PUSCH repetitions based at least in part on the number of repetitions. For example, the UE 1502 may be configured to apply frequency hopping for Msg3 PUSCH repetitions when number of repetitions are greater than a threshold (e.g., number of repetitions K>threshold).

At 1512, based on the indication 1506 and/or the determination for the frequency hopping pattern 1511, the UE 1502 may transmit, to the base station 1504, a Msg3 PUSCH 1514 and one or more Msg3 PUSCH repetitions with frequency hopping and based on the frequency hopping pattern. For example, as shown by the diagram 1500, if the UE 1502 is configured to transmit K Msg3 PUSCH repetitions following the transmission of the Msg3 PUSCH 1514 at a slot n, the UE 1502 may transmit a first Msg3 PUSCH repetition 1516 (e.g., repetition #0) using a first frequency band (e.g., frequency band 4) and a first time resource (e.g., at slot n+1), the UE 1502 may transmit a second Msg3 PUSCH repetition 1518 (e.g., repetition #1) using a second frequency band (e.g., frequency band 3) and a second time resource (e.g., at slot n+2) . . . and the UE 1502 may transmit the Kth Msg3 PUSCH repetition 1520 (e.g., repetition #(K−1) using a frequency band (e.g., may be a frequency band used by the first or the second Msg3 PISCH repetition or a different frequency band) and a Kth time resource (e.g., at slot n+K), etc. While the diagram 1500 shows the UE 1502 transmits each of the Msg3 PUSCH repetitions in different slots, the UE 1502 also be configured to transmit more than one Msg3 PUSCH repetition within a slot or to transmit one Msg3 PUSCH repetition per every X slots (e.g., X>1). In addition, a frequency band may be used more than once for the frequency hopping. For example, one or more Msg3 PUSCH repetitions may be transmitted using a first frequency band but at different time slots, and one or more Msg3 PUSCH repetitions may be transmitted using a second frequency band but at different time slots, etc.

Figure 16:
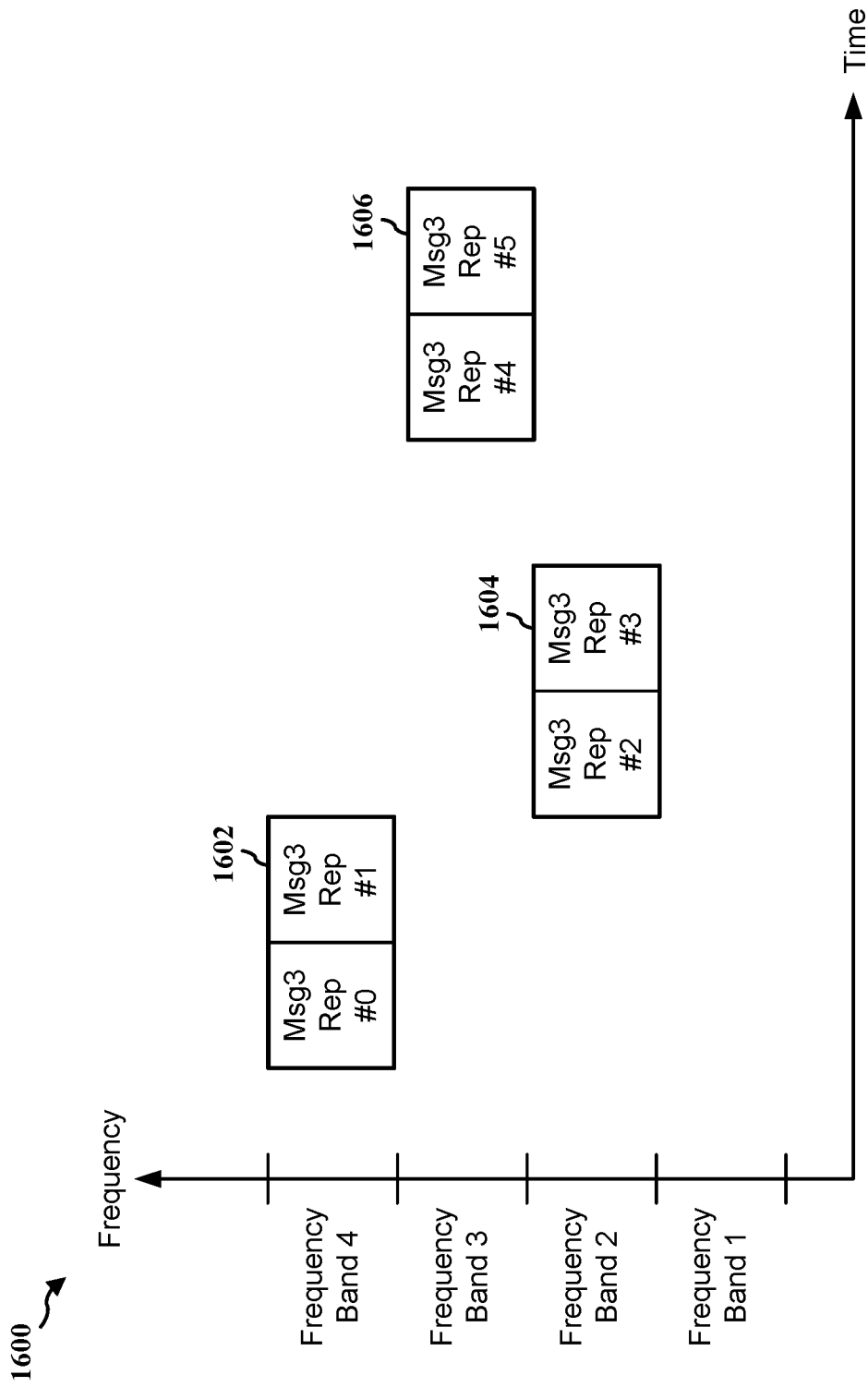
FIG. 16 is a diagram illustrating an example of transmitting Msg3 PUSCH retransmissions in bundles according to aspects of the present disclosure.

In another aspect of the present disclosure, a UE may be configured to transmit one or more Msg3 PUSCH retransmissions in multiple bundles, such as in the case of a demodulation reference signal (DMRS) bundling indication being indicated to the UE for Msg3 PUSCH repetitions. Based on the configuration, the UE may apply the frequency hopping between the multiple bundles. FIG. 16 is a diagram 1600 illustrating an example of transmitting Msg3 PUSCH retransmissions in bundles according to aspects of the present disclosure. For example, a first bundle 1602 may include a first Msg3 PUSCH repetition (e.g., repetition #0) and a second Msg3 PUSCH repetition (e.g., repetition #1), a second bundle 1604 may include a third Msg3 PUSCH repetition (e.g., repetition #2) and a fourth Msg3 PUSCH repetition (e.g., repetition #3), a third bundle 1606 may include a fifth Msg3 PUSCH repetition (e.g., repetition #4) and a sixth Msg3 PUSCH repetition (e.g., repetition #5), etc. As such, when the UE is transmitting the Msg3 PUSCH retransmissions in bundles, the UE may apply the frequency hopping between bundles. For example, the UE may transmit the first bundle 1602 using a first frequency band (e.g., frequency band 4), the second bundle 1604 using a second frequency band (e.g., frequency band 2), and the third bundle 1606 using a third frequency band (e.g., frequency band 3), etc. In such an example or configuration, the UE may be configured or specified to apply frequency hopping when the number of repetitions are greater than two (2). In addition, the Msg3 repetitions may be divided to bundles where each bundle may include two or more repetitions, and the frequency hopping may be applied between the bundles, but may not be applied inside the bundles. In other words, in case of DMRS bundling indication for Msg3 PUSCH repetitions, frequency hopping may be applied by the UE if the number of repetitions are greater than 2. Also, Msg3 repetitions may be divided to bundles where each bundle consists of two repetition and frequency hopping may be applied between the bundles (not inside the bundles).

Figure 17:
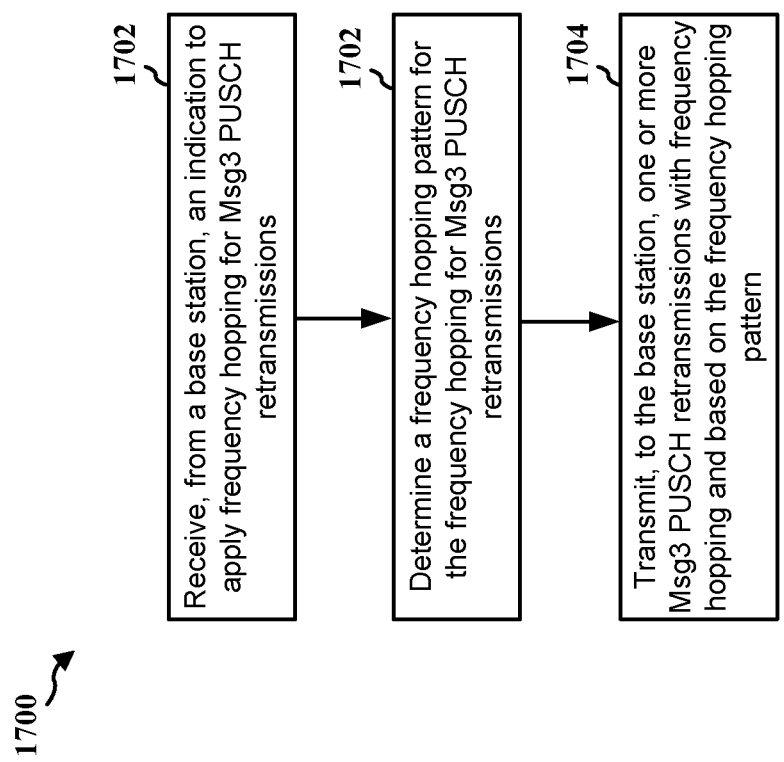
FIG. 17 is a flowchart of a first method of wireless communication in accordance with aspects presented herein.

FIG. 17 is a flowchart 1700 of a method of wireless communication. The method may be performed by a UE or a component of a UE (e.g., the UE 174, 350, 1102, 1202, 1302, 1502; the apparatus 1802; a processing system, which may include the memory 360 and which may be the entire UE 350 or a component of the UE 350, such as the TX processor 368, the RX processor 356, and/or the controller/processor 359). Optional aspects are illustrated with a dashed line. The method may enable the UE to apply frequency hopping for Msg3 PUSCH retransmissions of a RACH procedure.

At 1702, the UE may receive, from a base station, an indication to apply frequency hopping for Msg3 PUSCH retransmissions, such as described in connection with FIGS. 15 and 16. For example, at 1506, the UE 1502 may receive an indication 1508 from the base station 1504 indicating the UE 1502 to apply frequency hopping for Msg3 PUSCH retransmissions. The reception of the indication may be performed, e.g., by the frequency hopping process component 1840 and/or the reception component 1830 of the apparatus 1802 in FIG. 18. In one example, the UE may receive the indication via an RMSI message. In another example, the UE may receive the indication via a Msg2 PDCCH or a Msg2 of a four-step RACH procedure.

In one aspect, the indication to apply frequency hopping for Msg3 PUSCH retransmissions may be based on the UE receiving a configuration from the base station to transmit a Msg3 PUSCH including the one or more Msg3 PUSCH retransmissions. For example, as described in connection with FIG. 15, if the UE receives a configuration for transmitting Msg3 PUSCH with repetitions, the UE may apply frequency hopping to the Msg3 PUSCH repetitions.

In another aspect, the indication to apply frequency hopping for Msg3 PUSCH retransmissions may be based on the UE receiving a configuration from the base station to transmit a Msg3 PUSCH including at least two Msg3 PUSCH retransmissions. For example, as described in connection with FIG. 15, if the UE receives a configuration for transmitting Msg3 PUSCH repetitions, the UE may apply frequency hopping to the Msg3 PUSCH repetitions when the number of Msg3 PUSCH repetitions is greater than a threshold (e.g., K>2).

At 1704, the UE may select a frequency hopping pattern for the frequency hopping for Msg3 PUSCH retransmissions, such as described in connection with FIGS. 15 and 16. For example, at 1510, the UE 1502 may determine a frequency hopping pattern 1511 for the frequency hopping for Msg3 PUSCH retransmissions. The determination of the frequency hopping pattern may be performed, e.g., by the frequency hopping pattern determination component 1842 of the apparatus 1802 in FIG. 18. In one example, the frequency hopping pattern may be determined based on one or more predefined conditions or parameters. In another example, the frequency hopping pattern may be determined based at least in part on a frequency location of a first Msg3 PUSCH retransmission.

In one aspect, the UE may be configured with multiple frequency hopping patterns. Then, the UE may receive, from the base station, an indication of which of the multiple frequency hopping patterns to apply. The indication of which of the multiple frequency hopping patterns to apply may be received via an RMSI message, a Msg2 PDCCH, or a Msg2 of a four-step RACH procedure.

At 1706, the UE may transmit, to the base station, one or more Msg3 PUSCH retransmissions with frequency hopping and based on the frequency hopping pattern, such as described in connection with FIGS. 15 and 16. For example, at 1512, the UE 1502 may transmit one or more Msg3 PUSCH retransmissions to the base station 1504 with frequency hopping and based on the frequency hopping pattern 1511. The transmission of the one or more Msg3 PUSCH retransmissions with frequency hopping and based on the frequency hopping pattern may be performed, e.g., by the frequency hopping configuration component 1844 and/or the transmission component 1834 of the apparatus 1802 in FIG. 18. In one example, the one or more Msg3 PUSCH retransmissions may be transmitted by the UE based on a PUSCH repetition Type A or a PUSCH repetition Type B, such as described in connection with FIGS. 14A and 14B respectively.

In one example, as described in connection with FIG. 16, the UE may transmit the one or more Msg3 PUSCH retransmissions in multiple bundles and the frequency hopping may be applied between the multiple bundles. In such an example, each of the multiple bundles may include two or more Msg3 PUSCH retransmissions.

Figure 18:
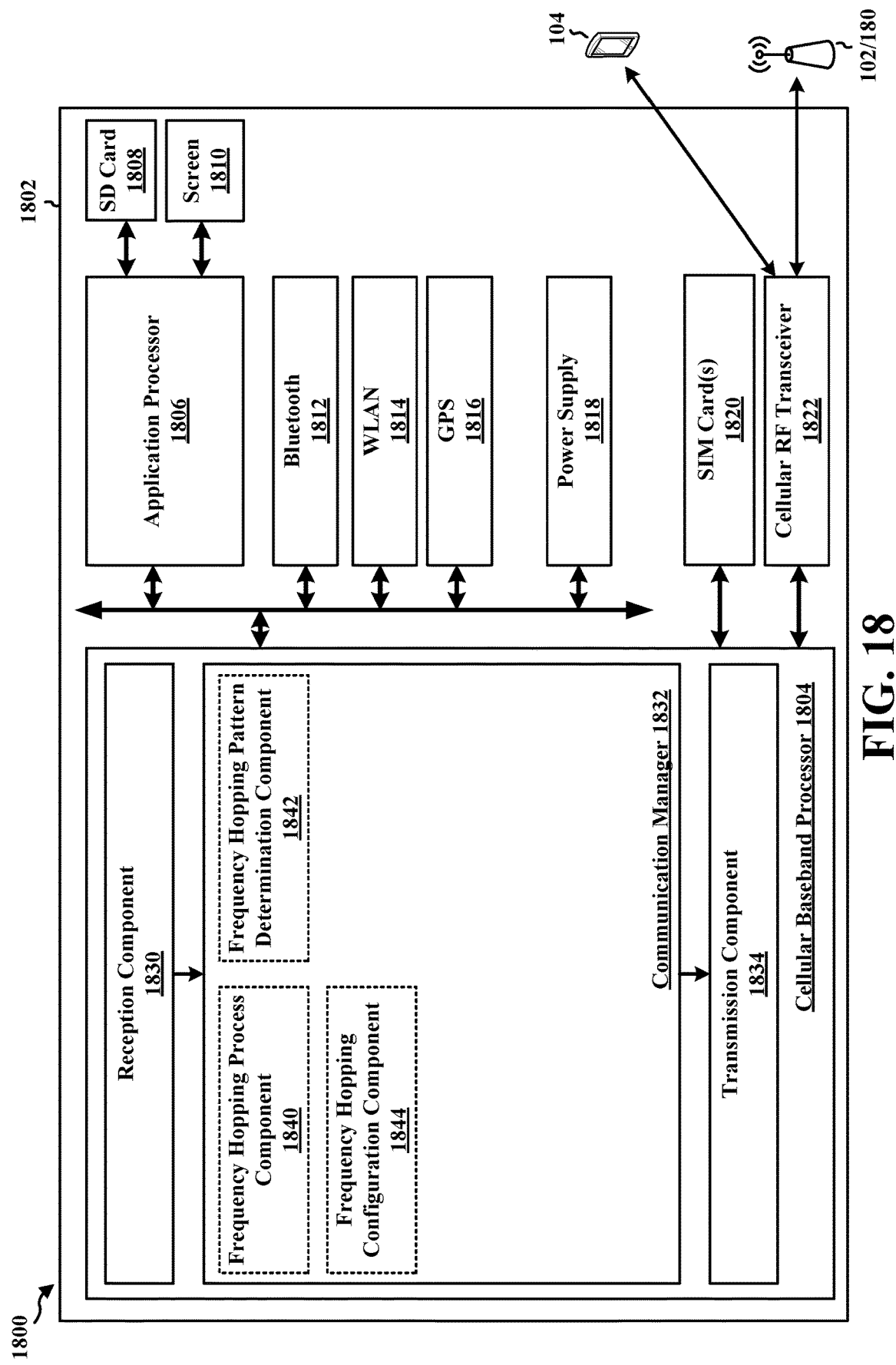
FIG. 18 is a diagram illustrating a first example of a hardware implementation for an example apparatus in accordance with aspects presented herein.

FIG. 18 is a diagram 1800 illustrating an example of a hardware implementation for an apparatus 1802. The apparatus 1802 is a UE and includes a cellular baseband processor 1804 (also referred to as a modem) coupled to a cellular RF transceiver 1822 and one or more subscriber identity modules (SIM) cards 1820, an application processor 1806 coupled to a secure digital (SD) card 1808 and a screen 1810, a Bluetooth module 1812, a wireless local area network (WLAN) module 1814, a Global Positioning System (GPS) module 1816, and a power supply 1818. The cellular baseband processor 1804 communicates through the cellular RF transceiver 1822 with the UE 174 and/or BS 172/180. The cellular baseband processor 1804 may include a computer-readable medium/memory. The computer-readable medium/memory may be non-transitory. The cellular baseband processor 1804 is responsible for general processing, including the execution of software stored on the computer-readable medium/memory. The software, when executed by the cellular baseband processor 1804, causes the cellular baseband processor 1804 to perform the various functions described supra. The computer-readable medium/memory may also be used for storing data that is manipulated by the cellular baseband processor 1804 when executing software. The cellular baseband processor 1804 further includes a reception component 1830, a communication manager 1832, and a transmission component 1834. The communication manager 1832 includes the one or more illustrated components. The components within the communication manager 1832 may be stored in the computer-readable medium/memory and/or configured as hardware within the cellular baseband processor 1804. The cellular baseband processor 1804 may be a component of the UE 350 and may include the memory 360 and/or at least one of the TX processor 368, the RX processor 356, and the controller/processor 359. In one configuration, the apparatus 1802 may be a modem chip and include just the baseband processor 1804, and in another configuration, the apparatus 1802 may be the entire UE (e.g., see 350 of FIG. 3) and include the additional modules of the apparatus 1802 discussed above.

The communication manager 1832 includes frequency hopping process component 1840 that is configured to receive, from a base station, an indication to apply frequency hopping for Msg3 PUSCH retransmissions, e.g., as described in connection with 1702 of FIG. 17. The communication manager 1832 further includes a frequency hopping pattern determination component 1842 that is configured to determine a frequency hopping pattern for the frequency hopping for Msg3 PUSCH retransmissions, e.g., as described in connection with 1704 of FIG. 17. The communication manager 1832 further includes a frequency hopping configuration component 1844 that is configured to transmit, to the base station, one or more Msg3 PUSCH retransmissions with frequency hopping and based on the frequency hopping pattern, e.g., as described in connection with 1706 of FIG. 17.

The apparatus may include additional components that perform each of the blocks of the algorithm in the aforementioned flowchart of FIG. 17. As such, each block in the aforementioned flowchart of FIG. 17 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1802, and in particular the cellular baseband processor 1804, includes means for receiving, from a base station, an indication to apply frequency hopping for Msg3 PUSCH retransmissions (e.g., the frequency hopping process component 1840 and/or the reception component 1830). The apparatus 1802 includes means for determining a frequency hopping pattern for the frequency hopping for Msg3 PUSCH retransmissions (e.g., the frequency hopping pattern determination component 1842). The apparatus 1802 includes means for transmitting, to the base station, one or more Msg3 PUSCH retransmissions with frequency hopping and based on the frequency hopping pattern (e.g., the frequency hopping configuration component 1844).

In one configuration, the UE may receive the indication via an RMSI message. In another configuration, the UE may receive the indication via a Msg2 PDCCH or a Msg2 of a four-step RACH procedure.

In one configuration, the indication to apply frequency hopping for Msg3 PUSCH retransmissions may be based on the UE receiving a configuration from the base station to transmit a Msg3 PUSCH including the one or more Msg3 PUSCH retransmissions.

In one configuration, the indication to apply frequency hopping for Msg3 PUSCH retransmissions may be based on the UE receiving a configuration from the base station to transmit a Msg3 PUSCH including at least two Msg3 PUSCH retransmissions.

In one configuration, the frequency hopping pattern may be determined based on one or more predefined conditions or parameters. In another configuration, the frequency hopping pattern may be determined based at least in part on a frequency location of a first Msg3 PUSCH retransmission.

In one configuration, the UE may be configured with multiple frequency hopping patterns. Then, the UE may receive, from the base station, an indication of which of the multiple frequency hopping patterns to apply. The indication of which of the multiple frequency hopping patterns to apply may be received via an RMSI message, a Msg2 PDCCH, or a Msg2 of a four-step RACH procedure.

In one configuration, the one or more Msg3 PUSCH retransmissions may be transmitted by the UE based on a PUSCH repetition Type A or a PUSCH repetition Type B.

In one configuration, the UE may transmit the one or more Msg3 PUSCH retransmissions in multiple bundles and the frequency hopping may be applied between the multiple bundles. In such a configuration, each of the multiple bundles may include two or more Msg3 PUSCH retransmissions.

The aforementioned means may be one or more of the aforementioned components of the apparatus 1802 configured to perform the functions recited by the aforementioned means. As described supra, the apparatus 1802 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 19:
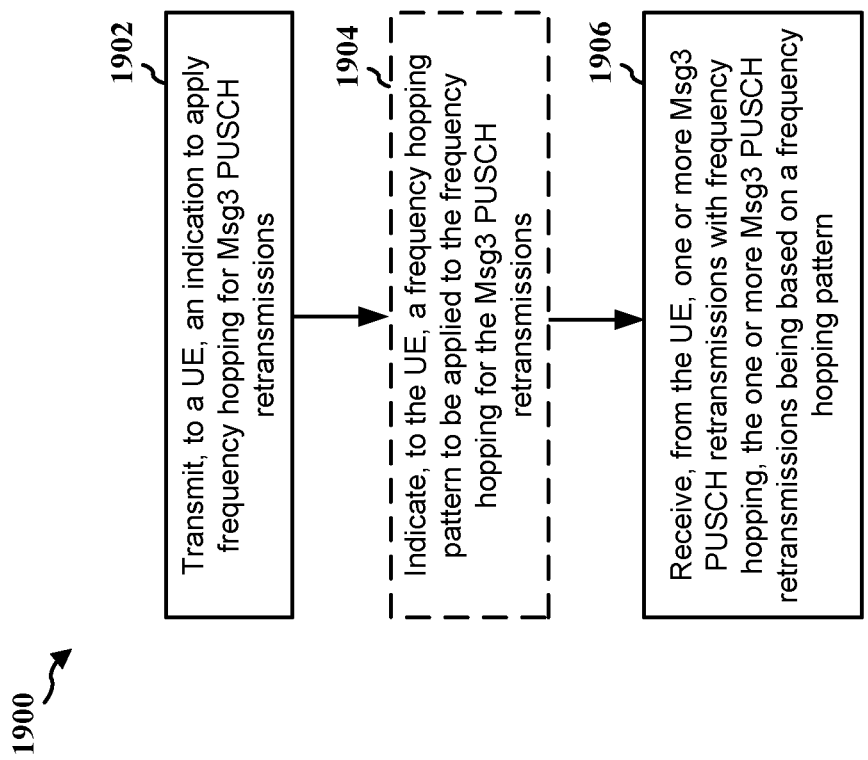
FIG. 19 is a flowchart of a second method of wireless communication in accordance with aspects presented herein.

FIG. 19 is a flowchart 1900 of a method of wireless communication. The method may be performed by a base station or a component of a base station (e.g., the base station 172, 180, 310, 1104, 1204, 1304, 1504; the apparatus 2002; a processing system, which may include the memory 376 and which may be the entire base station 310 or a component of the base station 310, such as the TX processor 316 the RX processor 370, and/or the controller/processor 375). Optional aspects are illustrated with a dashed line. The method may enable the base station to indicate to a UE to apply frequency hopping for Msg3 PUSCH retransmissions of a RACH procedure.

At 1902, the base station may transmit, to a UE, an indication to apply frequency hopping for Msg3 PUSCH retransmissions, such as described in connection with FIG. 15. For example, at 1506, the base station 1504 may transmit an indication 1508 to the UE 1502 indicating the UE 1502 to apply frequency hopping for Msg3 PUSCH retransmissions. The transmission of the indication may be performed, e.g., by the frequency hopping indication component 2040 and/or the transmission component 2034 of the apparatus 2002 in FIG. 20. In one example, the indication may be transmitted via an RMSI message. In another example, the indication may be transmitted via a Msg2 PDCCH or a Msg2 of a four-step RACH procedure.

At 1904, the base station may indicate, to the UE, a frequency hopping pattern to be applied to the frequency hopping for the Msg3 PUSCH retransmissions, such as described in connection with FIG. 15. The indication of the frequency hopping pattern may be performed, e.g., by the frequency hopping pattern configuration component 2042 and/or the transmission component 2034 of the apparatus 2002 in FIG. 20.

In one example, the UE may be configured with multiple frequency hopping patterns, and the indication for the frequency hopping pattern may indicate which of the multiple frequency hopping patterns to apply. In such an example, the indication of which of the multiple the frequency hopping patterns to apply may be transmitted via an RMSI message, a Msg2 PDCCH, or a Msg2 of four-step a RACH procedure.

At 1906, the base station may receive, from the UE, one or more Msg3 PUSCH retransmissions with frequency hopping, the one or more Msg3 PUSCH retransmissions being based on a frequency hopping pattern. The reception of the Msg3 PUSCH retransmissions may be performed, e.g., by the Msg3 PUSCH reception component 2044 and/or the reception component 2030 of the apparatus 2002 in FIG. 20.

In one example, the one or more Msg3 PUSCH retransmissions may be received based on a PUSCH repetition Type A or a PUSCH repetition Type B. In another example, the base station may receive the one or more Msg3 PUSCH retransmissions in multiple bundles and the frequency hopping may be applied between the multiple bundles. In such an example, each of the multiple bundles may include two or more Msg3 PUSCH retransmissions.

Figure 20:
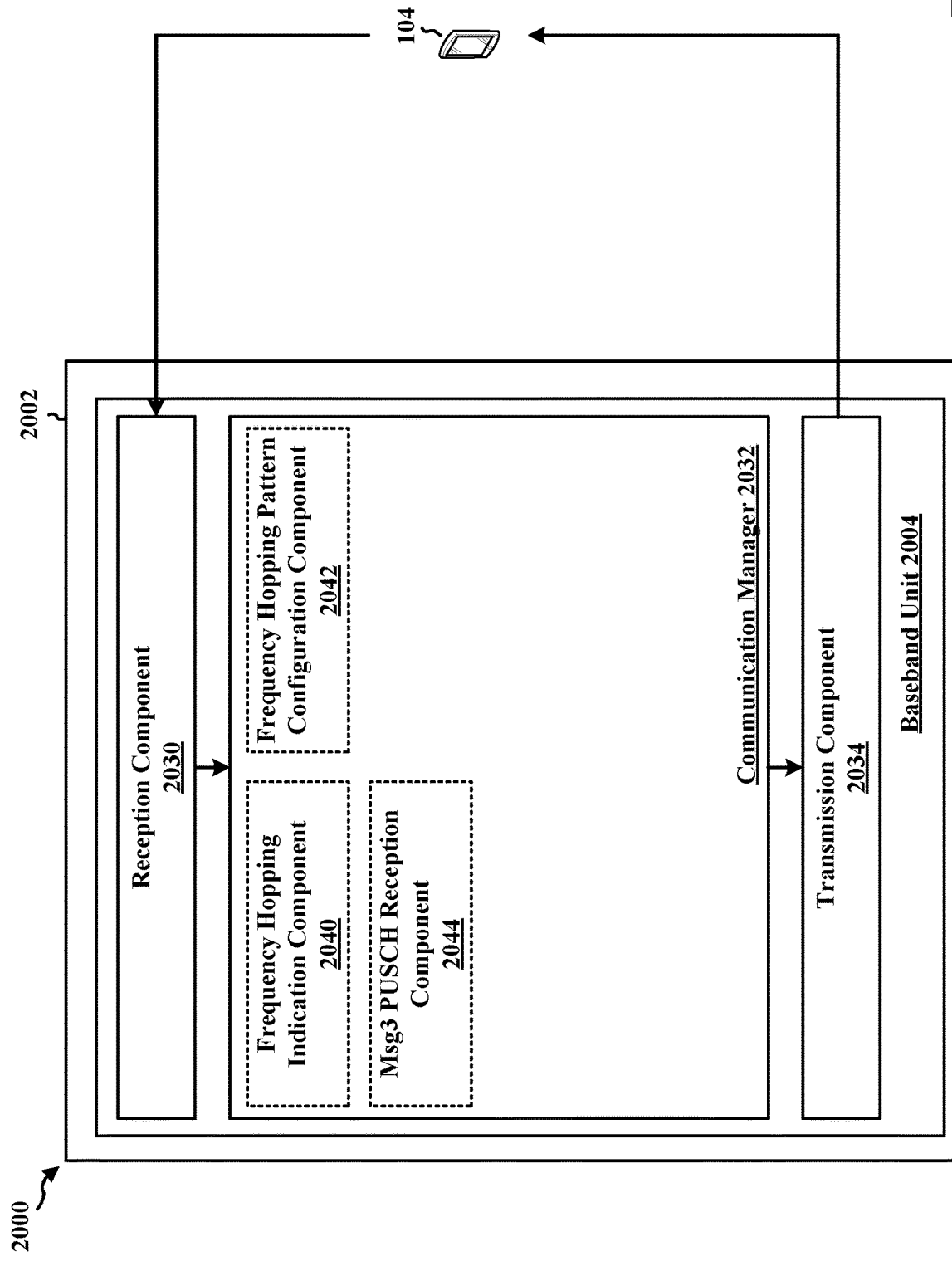
FIG. 20 is a diagram illustrating a second example of a hardware implementation for an example apparatus in accordance with aspects presented herein.

FIG. 20 is a diagram 2000 illustrating an example of a hardware implementation for an apparatus 2002. The apparatus 2002 is a BS and includes a baseband unit 2004. The baseband unit 2004 may communicate through a cellular RF transceiver with the UE 174. The baseband unit 2004 may include a computer-readable medium/memory. The baseband unit 2004 is responsible for general processing, including the execution of software stored on the computer-readable medium/memory. The software, when executed by the baseband unit 2004, causes the baseband unit 2004 to perform the various functions described supra. The computer-readable medium/memory may also be used for storing data that is manipulated by the baseband unit 2004 when executing software. The baseband unit 2004 further includes a reception component 2030, a communication manager 2032, and a transmission component 2034. The communication manager 2032 includes the one or more illustrated components. The components within the communication manager 2032 may be stored in the computer-readable medium/memory and/or configured as hardware within the baseband unit 2004. The baseband unit 2004 may be a component of the BS 310 and may include the memory 376 and/or at least one of the TX processor 316, the RX processor 370, and the controller/processor 375.

The communication manager 2032 includes a frequency hopping component 2040 that is configured to transmit, to a UE, an indication to apply frequency hopping for Msg3 PUSCH retransmissions, e.g., as described in connection with 1902 of FIG. 19. The communication manager 2032 further includes a frequency hopping pattern configuration component 2042 that is configured to indicate, to the UE, a frequency hopping pattern to be applied to the frequency hopping for the Msg3 PUSCH retransmissions, e.g., as described in connection with 1904 of FIG. 19. The communication manager 2032 further includes a Msg3 PUSCH reception component 2044 that is configured to receive, from the UE, one or more Msg3 PUSCH retransmissions with frequency hopping, the one or more Msg3 PUSCH retransmissions being based on a frequency hopping pattern, e.g., as described in connection with 1906 of FIG. 19.

The apparatus may include additional components that perform each of the blocks of the algorithm in the aforementioned flowchart of FIG. 19. As such, each block in the aforementioned flowchart of FIG. 19 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 2002, and in particular the baseband unit 2004, includes means for transmitting, to a UE, an indication to apply frequency hopping for Msg3 PUSCH retransmissions (e.g., the frequency hopping indication component 2040 and/or the transmission component 2034). The apparatus 2002 includes means for receiving, from the UE, one or more Msg3 PUSCH retransmissions with frequency hopping, the one or more Msg3 PUSCH retransmissions being based on a frequency hopping pattern (e.g., the Msg3 PUSCH reception component 2044 and/or the reception component 2030). The apparatus 2002 may further include means for indicating, to the UE, a frequency hopping pattern to be applied to the frequency hopping for the Msg3 PUSCH retransmissions (e.g., the frequency hopping pattern configuration component 2042 and/or the transmission component 2034).

In one configuration, the indication may be transmitted via an RMSI message. In another configuration, the indication may be transmitted via a Msg2 PDCCH or a Msg2 of a four-step RACH procedure.

In one configuration, the UE may be configured with multiple frequency hopping patterns, and the indication for the frequency hopping pattern may indicate which of the multiple frequency hopping patterns to apply. In such a configuration, the indication of which of the multiple the frequency hopping patterns to apply may be transmitted via an RMSI message, a Msg2 PDCCH, or a Msg2 of four-step a RACH procedure.

In one configuration, the one or more Msg3 PUSCH retransmissions may be received based on a PUSCH repetition Type A or a PUSCH repetition Type B. In another configuration, the base station may receive the one or more Msg3 PUSCH retransmissions in multiple bundles and the frequency hopping may be applied between the multiple bundles. In such a configuration, each of the multiple bundles may include two or more Msg3 PUSCH retransmissions.

The aforementioned means may be one or more of the aforementioned components of the apparatus 2002 configured to perform the functions recited by the aforementioned means. As described supra, the apparatus 2002 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

ADDITIONAL IMPLEMENTATIONS

The specific order or hierarchy of blocks in the processes/flowcharts disclosed is an illustration of example approaches. Based upon design preferences, the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

Aspects of the present disclosure includes a method of wireless communication for a user equipment (UE), including receiving a random access response (RAR) message that includes a physical downlink control channel (PDCCH) portion and a physical downlink shared channel (PDSCH) portion determining at least one random access message 3 repetition parameter based on the RAR message and transmitting a random access message 3 with repetition according to the at least one random access message 3 repetition parameter.

Aspects of the present disclosure includes the method above, wherein the at least one random access message 3 repetition parameter includes at least one of: presence of repetition, type of repetition, number of repetitions, frequency offset for frequency hopping, beam index, or TCI state.

Aspects of the present disclosure includes any of the methods above, wherein the PDCCH portion includes a bit field that indicates the at least one random access message 3 repetition parameter.

Aspects of the present disclosure includes any of the methods above, wherein the bit field is a single bit that indicates repetition of the random access message 3.

Aspects of the present disclosure includes any of the methods above, further comprising receiving system information that indicates an additional random access message 3 repetition parameter.

Aspects of the present disclosure includes any of the methods above, wherein determining the at least one random access message 3 repetition parameter based on the RAR message comprises selecting a set of preconfigured parameters based on the RAR message.

Aspects of the present disclosure includes any of the methods above, wherein the PDSCH portion includes the at least one random access message 3 repetition parameter. Aspects of the present disclosure includes any of the methods above, wherein transmitting the random access message 3 with repetition comprises: selecting a repetition type and determining time and frequency domain resources for a number of repetitions of the random access message 3 based on the at least one random access message 3 parameter and the repetition type.

Aspects of the present disclosure includes any of the methods above, wherein selecting the repetition type is based on at least one of frequency range, subcarrier spacing, or payload size of the random access message 3.

Aspects of the present disclosure includes any of the methods above, wherein selecting the repetition type is based on system information.

Aspects of the present disclosure includes any of the methods above, wherein selecting the repetition type is based on the RAR message.

Aspects of the present disclosure includes any of the methods above, wherein transmitting the random access message 3 with repetition comprises using a different power level for different repetitions.

Aspects of the present disclosure includes any of the methods above, wherein the at least one random access message 3 repetition parameter indicates a change in the power level between repetitions.

Aspects of the present disclosure includes an apparatus for wireless communication, including a processing system configured to perform any of the methods above.

Aspects of the present disclosure includes an apparatus for wireless communication, including means for performing any of the methods above.

Aspects of the present disclosure includes a non-transitory computer-readable medium storing computer executable code, the code when executed by a processor causes the processor to perform any of the methods above.

Aspects of the present disclosure includes a method of wireless communication for a base station, including transmitting a random access response (RAR) message including a physical downlink control channel (PDCCH) portion and a physical downlink shared channel (PDSCH) portion, determining at least one random access message 3 repetition parameter based on the RAR message, and receiving a random access message 3 with repetition according to the at least one random access message 3 repetition parameter.

Aspects of the present disclosure includes the method above, wherein the at least one random access message 3 repetition parameter includes at least one of: presence of repetition, type of repetition, number of repetitions, frequency offset for frequency hopping, beam index, or TCI state.

Aspects of the present disclosure includes any of the methods above, wherein the PDCCH portion includes a bit field that indicates the at least one random access message 3 repetition parameter.

Aspects of the present disclosure includes any of the methods above, wherein the bit field is a single bit that indicates repetition of the random access message 3.

Aspects of the present disclosure includes any of the methods above, further comprising transmitting system information that indicates an additional random access message 3 repetition parameter.

Aspects of the present disclosure includes any of the methods above, wherein determining the at least one random access message 3 repetition parameter based on the RAR message comprises selecting a set of preconfigured parameters based on the RAR message.

Aspects of the present disclosure includes any of the methods above, wherein the PDSCH portion includes the at least one random access message 3 repetition parameter.

Aspects of the present disclosure includes any of the methods above, wherein receiving the random access message 3 with repetition comprises determining a repetition type and determining time and frequency domain resources for a number of repetitions of the random access message 3 based on the at least one random access message 3 parameter and the repetition type.

Aspects of the present disclosure includes any of the methods above, wherein determining the repetition type is based on at least one of frequency range, subcarrier spacing, or payload size of the random access message 3.

Aspects of the present disclosure includes any of the methods above, wherein determining the repetition type is based on system information.

Aspects of the present disclosure includes any of the methods above, wherein determining the repetition type is based on the RAR message.

Aspects of the present disclosure includes any of the methods above, wherein the at least one random access message 3 repetition parameter indicates a change in a power level of the random access message 3 between repetitions.

Aspects of the present disclosure includes an apparatus for wireless communication, including a processing system configured to perform any of the methods above.

Aspects of the present disclosure includes an apparatus for wireless communication, including means for performing any of the methods above.

Aspects of the present disclosure includes a non-transitory computer-readable medium storing computer executable code, the code when executed by a processor causes the processor to perform any of the methods above.

Aspects of the present disclosure includes a method of wireless communication of a UE, comprising: receiving, from a base station, an indication to apply frequency hopping for Msg3 PUSCH retransmissions; determining a frequency hopping pattern for the frequency hopping for Msg3 PUSCH retransmissions; and transmitting, to the base station, one or more Msg3 PUSCH retransmissions with frequency hopping and based on the frequency hopping pattern.

Aspects of the present disclosure includes the method above, further includes that the indication is received via an RMSI message.

Aspects of the present disclosure includes any of the methods above, further includes that the indication is received via a Msg2 PDCCH or a Msg2 of a four-step RACH procedure.

Aspects of the present disclosure includes any of the methods above, further includes that the indication to apply frequency hopping for Msg3 PUSCH retransmissions is based on receiving a configuration from the base station to transmit a Msg3 PUSCH including the one or more Msg3 PUSCH retransmissions.

Aspects of the present disclosure includes any of the methods above, further includes that the one or more Msg3 PUSCH retransmissions are transmitted based on a PUSCH repetition Type A or a PUSCH repetition Type B.

Aspects of the present disclosure includes any of the methods above, further includes that the indication to apply frequency hopping for Msg3 PUSCH retransmissions is based on receiving a configuration from the base station to transmit a Msg3 PUSCH including at least two Msg3 PUSCH retransmissions.

Aspects of the present disclosure includes any of the methods above, further includes that the UE transmits the one or more Msg3 PUSCH retransmissions in multiple bundles and the frequency hopping is applied between the multiple bundles.

Aspects of the present disclosure includes any of the methods above, further includes that each of the multiple bundles includes two or more Msg3 PUSCH retransmissions.

Aspects of the present disclosure includes any of the methods above, further includes that the frequency hopping pattern is determined based on one or more predefined conditions or parameters.

Aspects of the present disclosure includes any of the methods above, further includes that the frequency hopping pattern is determined based at least in part on a frequency location of a first Msg3 PUSCH retransmission.

Aspects of the present disclosure includes any of the methods above, further includes that UE is configured with multiple frequency hopping patterns, and further comprising receiving, from the base station, an indication of which of the multiple frequency hopping patterns to apply.

Aspects of the present disclosure includes any of the methods above, further includes that the indication of which of the multiple frequency hopping patterns to apply is received via an RMSI message, a Msg2 PDCCH, or a Msg2 of a four-step RACH procedure.

Aspects of the present disclosure includes an apparatus for wireless communication including at least one processor coupled to a memory and configured to implement any of the methods above.

Aspects of the present disclosure includes an apparatus for wireless communication including means for implementing any of the methods above.

Aspects of the present disclosure includes a non-transitory computer-readable medium storing computer executable code, where the code when executed by a processor causes the processor to implement any of the methods above.

Aspects of the present disclosure includes a method of wireless communication at a base station, comprising: transmitting, to a UE, an indication to apply frequency hopping for Msg3 PUSCH retransmissions; and receiving, from the UE, one or more Msg3 PUSCH retransmissions with frequency hopping, the one or more Msg3 PUSCH retransmissions being based on a frequency hopping pattern.

Aspects of the present disclosure includes the method above, further includes that the indication is transmitted via an RMSI message.

Aspects of the present disclosure includes any of the methods above, further includes that the indication is transmitted via a Msg2 PDCCH or a Msg2 of a four-step RACH procedure.

Aspects of the present disclosure includes any of the methods above, further includes that the one or more Msg3 PUSCH retransmissions are received based on a PUSCH repetition Type A or a PUSCH repetition Type B.

Aspects of the present disclosure includes any of the methods above, further includes that the base station receives the one or more Msg3 PUSCH retransmissions in multiple bundles and the frequency hopping is applied between the multiple bundles.

Aspects of the present disclosure includes any of the methods above, further includes that each of the multiple bundles includes two or more Msg3 PUSCH retransmissions.

Aspects of the present disclosure includes any of the methods above, further comprises: indicating, to the UE, a frequency hopping pattern to be applied to the frequency hopping for the Msg3 PUSCH retransmissions.

Aspects of the present disclosure includes any of the methods above, further includes that the UE is configured with multiple frequency hopping patterns and further comprising transmitting, to the UE, an indication of which of the multiple frequency hopping patterns to apply.

Aspects of the present disclosure includes any of the methods above, further includes that the indication of which of the multiple the frequency hopping patterns to apply is transmitted via an RMSI message, a Msg2 PDCCH, or a Msg2 of four-step a RACH procedure.

Aspects of the present disclosure includes an apparatus for wireless communication including at least one processor coupled to a memory and configured to implement any of the methods above.

Aspects of the present disclosure includes an apparatus for wireless communication including means for implementing any of the methods above.

Aspects of the present disclosure includes a non-transitory computer-readable medium storing computer executable code, where the code when executed by a processor causes the processor to implement any of the methods above.

The previous description is provided to enable any person of ordinary skill in the art to practice the various aspects described herein. Various modifications to these aspects will be readily apparent to those of ordinary skill in the art, and the generic principles defined herein may be applied to other aspects. The claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication for a user equipment (UE), comprising:
   receiving a random access response (RAR) message that includes a physical downlink control channel (PDCCH) portion and a physical downlink shared channel (PDSCH) portion, wherein the PDCCH portion includes a bit field that indicates at least one random access message 3 repetition parameter, wherein the at least one random access message 3 repetition parameter indicates a change in a power level between random access message 3 repetitions;
   determining the at least one random access message 3 repetition parameter based on the RAR message; and
   transmitting a random access message 3 with repetition according to the at least one random access message 3 repetition parameter.

2. The method of claim 1, wherein the at least one random access message 3 repetition parameter includes at least one of: presence of repetition, type of repetition, number of repetitions, frequency offset for frequency hopping, beam index, or TCI state.

3. The method of claim 1, further comprising receiving system information that indicates an additional random access message 3 repetition parameter.

4. The method of claim 1, wherein determining the at least one random access message 3 repetition parameter based on the RAR message comprises selecting a set of preconfigured parameters based on the RAR message.

5. The method of claim 4, wherein the set of preconfigured parameters includes at least one of a starting symbol, a start and length indicator (SLIV), or a number of repetitions.

6. The method of claim 1, wherein the PDCCH portion includes the bit field in the downlink control information (DCI).

7. The method of claim 1, wherein transmitting the random access message 3 with repetition comprises:
   selecting a repetition type; and
   determining time and frequency domain resources for a number of repetitions of the random access message 3 based on the at least one random access message 3 parameter and the repetition type.

8. An apparatus for wireless communications, comprising:
   a memory storing instructions; and
   a processor configured to execute the instructions to:
      receive a random access response (RAR) message that includes a physical downlink control channel (PDCCH) portion and a physical downlink shared channel (PDSCH) portion, wherein the PDCCH portion includes a bit field that indicates at least one random access message 3 repetition parameter, wherein the at least one random access message 3 repetition parameter indicates a change in a power level between random access message 3 repetitions;
      determine the at least one random access message 3 repetition parameter based on the RAR message; and
      transmit a random access message 3 with repetition according to the at least one random access message 3 repetition parameter.

9. The apparatus of claim 8, wherein the at least one random access message 3 repetition parameter includes at least one of: presence of repetition, type of repetition, number of repetitions, frequency offset for frequency hopping, beam index, or TCI state.

10. The apparatus of claim 8, wherein the processor is further configured to receive system information that indicates an additional random access message 3 repetition parameter.

11. The apparatus of claim 8, wherein determining the at least one random access message 3 repetition parameter based on the RAR message comprises selecting a set of preconfigured parameters based on the RAR message.

12. The apparatus of claim 11, wherein the set of preconfigured parameters includes at least one of a starting symbol, a start and length indicator (SLIV), or a number of repetitions.

13. The apparatus of claim 8, wherein the PDCCH portion includes the bit field in the downlink control information (DCI).

14. The apparatus of claim 8, wherein transmitting the random access message 3 with repetition comprises:
   selecting a repetition type; and
   determining time and frequency domain resources for a number of repetitions of the random access message 3 based on the at least one random access message 3 parameter and the repetition type.

15. An apparatus for wireless communications, comprising:
   means for receiving a random access response (RAR) message that includes a physical downlink control channel (PDCCH) portion and a physical downlink shared channel (PDSCH) portion, wherein the PDCCH portion includes a bit field that indicates at least one random access message 3 repetition parameter, wherein the at least one random access message 3 repetition parameter indicates a change in a power level between random access message 3 repetitions;
   means for determining the at least one random access message 3 repetition parameter based on the RAR message; and
   means for transmitting a random access message 3 with repetition according to the at least one random access message 3 repetition parameter.

16. The apparatus of claim 15, wherein the at least one random access message 3 repetition parameter includes at least one of: presence of repetition, type of repetition, number of repetitions, frequency offset for frequency hopping, beam index, or TCI state.

17. The apparatus of claim 15, further comprises means for receiving system information that indicates an additional random access message 3 repetition parameter.

18. The apparatus of claim 15, wherein means for determining the at least one random access message 3 repetition parameter based on the RAR message comprises means for selecting a set of preconfigured parameters based on the RAR message.

19. The apparatus of claim 18, wherein the set of preconfigured parameters includes at least one of a starting symbol, a start and length indicator (SLIV), or a number of repetitions.

20. The apparatus of claim 15, wherein the PDCCH portion includes the bit field in the downlink control information (DCI).

21. The apparatus of claim 15, wherein means for transmitting the random access message 3 with repetition comprises:
means for selecting a repetition type; and
means for determining time and frequency domain resources for a number of repetitions of the random access message 3 based on the at least one random access message 3 parameter and the repetition type.

22. A non-transitory computer readable medium having instructions that, when executed by one or more processors of an apparatus, cause the one or more processors to:
receive a random access response (RAR) message that includes a physical downlink control channel (PDCCH) portion and a physical downlink shared channel (PDSCH) portion, wherein the PDCCH portion includes a bit field that indicates at least one random access message 3 repetition parameter, wherein the at least one random access message 3 repetition parameter indicates a change in a power level between random access message 3 repetitions;
determine the at least one random access message 3 repetition parameter based on the RAR message; and
transmit a random access message 3 with repetition according to the at least one random access message 3 repetition parameter.

23. The non-transitory computer readable medium of claim 22, wherein the at least one random access message 3 repetition parameter includes at least one of: presence of repetition, type of repetition, number of repetitions, frequency offset for frequency hopping, beam index, or TCI state.

24. The non-transitory computer readable medium of claim 22, further comprises instructions for receiving system information that indicates an additional random access message 3 repetition parameter.

25. The non-transitory computer readable medium of claim 22, wherein the instructions for determining the at least one random access message 3 repetition parameter based on the RAR message comprises instructions for selecting a set of preconfigured parameters based on the RAR message.

26. The non-transitory computer readable medium of claim 25, wherein the set of preconfigured parameters includes at least one of a starting symbol, a start and length indicator (SLIV), or a number of repetitions.

27. The non-transitory computer readable medium of claim 22, wherein the PDCCH portion includes the bit field in the downlink control information (DCI).

28. The non-transitory computer readable medium of claim 22, wherein the instructions for transmitting the random access message 3 with repetition comprises instructions for:
selecting a repetition type; and
determining time and frequency domain resources for a number of repetitions of the random access message 3 based on the at least one random access message 3 parameter and the repetition type.

* * * * *